United States Patent
Rettedal et al.

(10) Patent No.: US 11,307,728 B1
(45) Date of Patent: Apr. 19, 2022

(54) COMPUTERIZED SYSTEMS AND METHODS FOR LIVESTOCK MANAGEMENT

(71) Applicant: ST Reproductive Technologies, LLC, Navasota, TX (US)

(72) Inventors: Nicholas P. Rettedal, Berthoud, CO (US); Matheus Dasuke, College Station, TX (US); Randall Bond, Hilliard, OH (US)

(73) Assignee: Inguran, LLC, Navasota, TX (US)

(*) Notice: Subject to any disclaimer, the term of this patent is extended or adjusted under 35 U.S.C. 154(b) by 0 days.

(21) Appl. No.: 17/240,520

(22) Filed: Apr. 26, 2021

(51) Int. Cl.
*G06F 3/0481* (2022.01)
*G06F 3/04842* (2022.01)
*A01K 9/00* (2006.01)
*A01K 29/00* (2006.01)
*G08C 17/02* (2006.01)

(52) U.S. Cl.
CPC ........... *G06F 3/0481* (2013.01); *A01K 9/00* (2013.01); *A01K 29/005* (2013.01); *G06F 3/04842* (2013.01); *G08C 17/02* (2013.01)

(58) Field of Classification Search
CPC ..... G06F 3/0481; G06F 3/04842; A01K 9/00; A01K 29/005; G08C 17/02
USPC ........................................................ 715/716
See application file for complete search history.

(56) References Cited

U.S. PATENT DOCUMENTS

| | | | |
|---|---|---|---|
| 5,482,008 A | 1/1996 | Stafford et al. | |
| 5,532,692 A | 7/1996 | Tatsuya | |
| 5,697,384 A | 12/1997 | Miyawika | |
| 5,963,132 A | 10/1999 | Yoakum | |
| 5,984,875 A | 11/1999 | Brune | |
| 6,059,733 A | 5/2000 | Brune | |
| 6,099,482 A | 8/2000 | Brune | |
| 6,371,927 B1 | 4/2002 | Brune et al. | |
| 6,443,093 B1 * | 9/2002 | van der Lely | A01K 9/00 119/14.01 |
| 7,441,515 B2 | 10/2008 | Renz et al. | |
| 8,545,436 B2 | 10/2013 | Robertson et al. | |

(Continued)

FOREIGN PATENT DOCUMENTS

| | | |
|---|---|---|
| WO | 2011079338 A1 | 7/2011 |
| WO | 2011130771 A1 | 10/2011 |

(Continued)

OTHER PUBLICATIONS

Boehmer et al. Effects of Temperature of Consumed Water on Rumen Temperature of Beef Cows. Oklahoma Agricultural Experiment Station, 2009, 4 total pages.

(Continued)

*Primary Examiner* — William D Titcomb
(74) *Attorney, Agent, or Firm* — Ryan Christensen; Hashim Rahman

(57) ABSTRACT

Various examples are directed to livestock management systems and methods. A first user computing device may display a GUI comprising a first animal visual element. The first animal visual element may correspond to the first animal and indicate a first colostrum feeding of the first animal. When a user selects the first animal visual element, the user computing device may display a first colostrum input screen for receiving first colostrum data. The user computing device may also modify the first animal visual element to indicate the time status of the first testing action for the first animal.

20 Claims, 18 Drawing Sheets

(56) References Cited

U.S. PATENT DOCUMENTS

| | | |
|---|---|---|
| 8,588,887 B2 | 11/2013 | Arneson et al. |
| 8,640,712 B2 | 2/2014 | Ardrey, Jr. |
| 8,694,091 B2 | 4/2014 | Birk et al. |
| 8,771,201 B2 | 7/2014 | Gabriel et al. |
| 8,823,515 B2 | 9/2014 | Rettedal et al. |
| 9,504,231 B2 | 11/2016 | Rosenkranz et al. |
| 9,619,213 B2 | 4/2017 | Gupta et al. |
| 10,231,644 B2 * | 3/2019 | Rettedal ............... A61B 5/6861 |
| 10,306,868 B2 * | 6/2019 | Rettedal ............... A01K 11/008 |
| 10,390,515 B2 | 8/2019 | Bancroft et al. |
| 10,548,509 B2 | 2/2020 | Rettedal |
| 10,729,149 B2 | 8/2020 | Pedersen |
| 11,206,811 B2 * | 12/2021 | Rettedal ............... G06F 3/0482 |
| 2004/0133131 A1 | 7/2004 | Kuhn et al. |
| 2004/0155782 A1 | 8/2004 | Letkomiller et al. |
| 2006/0185605 A1 | 8/2006 | Renz et al. |
| 2007/0156016 A1 | 7/2007 | Betesh et al. |
| 2008/0236500 A1 | 10/2008 | Hodges et al. |
| 2009/0182207 A1 | 7/2009 | Riskey et al. |
| 2009/0187392 A1 | 7/2009 | Riskey et al. |
| 2016/0198739 A1 * | 7/2016 | Wan ............... A01K 11/006 426/2 |

FOREIGN PATENT DOCUMENTS

| | | | |
|---|---|---|---|
| WO | 2012173502 A1 | 12/2012 | |
| WO | 2017124126 A1 | 7/2017 | |
| WO | 2020097655 A1 | 5/2020 | |

OTHER PUBLICATIONS

Caja et al. Development of a ceramic bolus for the permanent electronic identification of sheep, goat and cattle. Computers and Electronics in Agriculture (1999), vol. 24, pp.

Carne et al. Modeling the retention of rumen boluses for the electronic identification of goats. J Dairy Sci, Feb. 2011, 94(2), pp. 716-726 (abstract only, 2 pages total).

Cooper-Prado, et al. Relationship of Ruminal Temperature with Parturition and Estrus of Beef Cows. J Anim Sci, Apr. 2011, 89:1020-1027; published ahead of print Dec. 17, 2011.

Hach. Digital Inductive Conductivity Sensor, Convertible Body Style. Website, http:/www.hach.com, product page downloaded Mar. 5, 2014, 2 total pages.

Fallon et al. Electronic Animal Identification. Grange Research Center, Beef Production Series No. 46, pp. 1-54.

Ghirardi et al. Evaluation of the retention of electronic identification boluses in the forestomachs of cattle. Journal of Animal Science (2006), vol. 84, pp. 2260-2268.

Ghirardi et al. Retention of different sizes of electronic identification boluses in the forestomachs of sheep. J Anim Sci, Nov. 2006, 84(10), pp. 2865-2872.

Scanga et al. Development of computational models for the purpose of conducting individual livestock and premises traceback investigations utilizing National Animal System compliant data. Journal of Animal Science, Dec. 2007, vol. 85, Issue 12, pp. 503-511.

Smartstock USA. Website, http://www.smartstock-usa.com, originally downloaded Dec. 30, 2011, 12 total pages.

* cited by examiner

FIG. 10

COMPUTERIZED SYSTEMS AND METHODS FOR LIVESTOCK MANAGEMENT

TECHNICAL FIELD

This document generally relates to methods and systems for use with computer systems and other devices. More particularly, this document relates to ways of configuring and operating computing devices and systems to facilitate the management of livestock.

BACKGROUND

Prior to birth, a mammal is protected from infection by the immune system of its mother. Because the mammal's immune system is not fully formed at birth, a newly-born mammal relies on outside immune assistance after birth. Milk, in the form of colostrum, consumed by a newly-born mammal includes antibodies that help the animal fight off viral and bacterial infection while the animal's immune system develops over the first few months of life.

Colostrum is the first milk generated by a mammal soon after giving birth, called colostrum, can be particularly effective in protecting a newborn animal and aiding in the development of its immune system. Colostrum includes higher levels of antibodies, hormones, and nutrients than typical mammalian milk Receiving colostrum at an early stage of life helps a newborn animal fight infection and develop a strong immune system.

BRIEF DESCRIPTION OF DRAWINGS

The present disclosure is illustrated by way of example and not limitation in the following figures.

FIGS. 8-16 are screen shots showing various screens that may be displayed at a user computing device as part of the GUI described herein.

DETAILED DESCRIPTION

Figure 1:
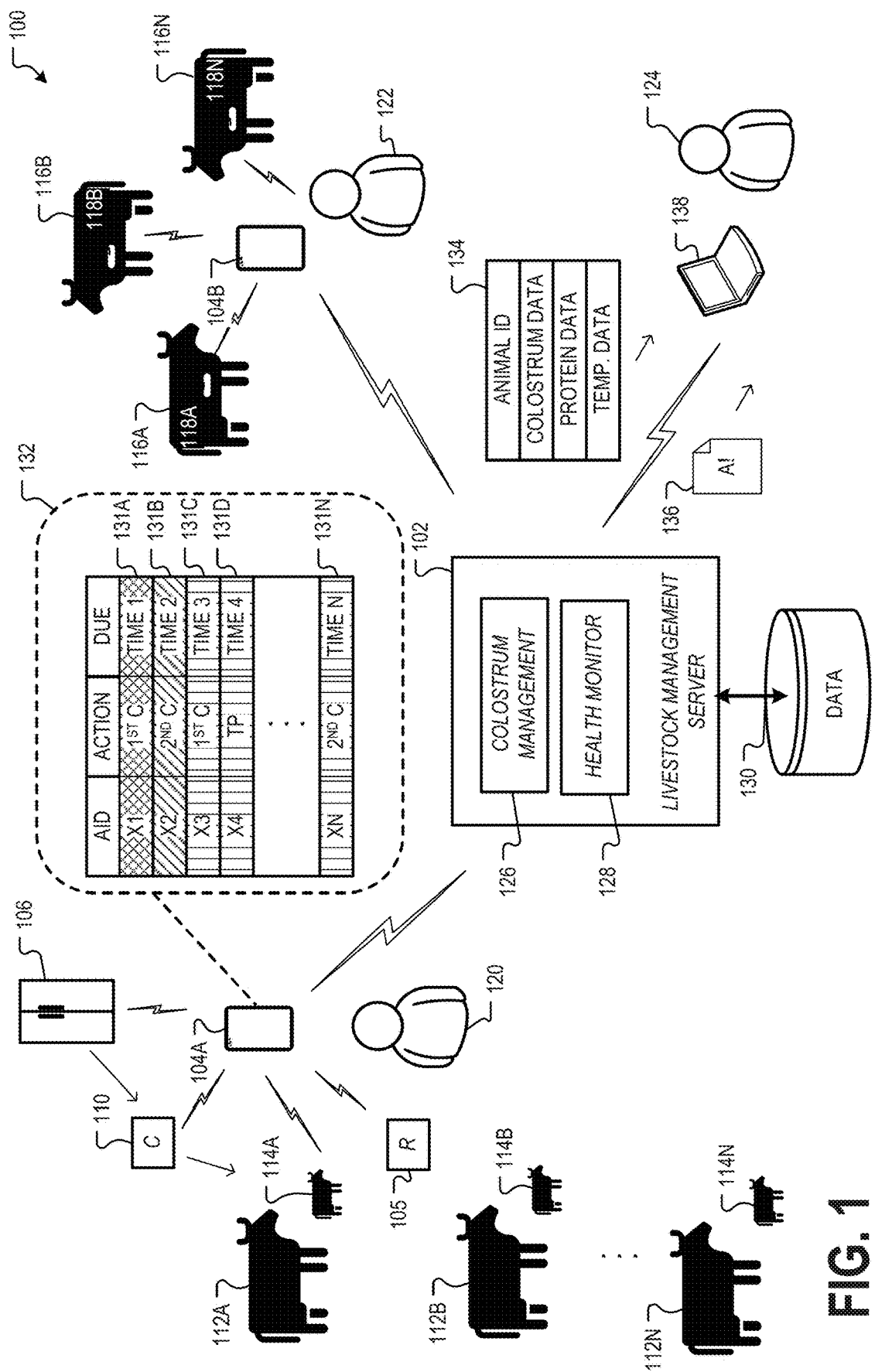
FIG. 1 is a diagram showing one example of an environment for implementing a computerized livestock management system.

When a mammal is born, its digestive track is initially open in a way that allows antibodies to enter the blood. Over the first twenty-four to forty-eight hours of life, the newborn mammal's digestive tract closes as its immune system develops. It is important that a newborn animal receive colostrum at the proper time or times before the animal's digestive tract closes. For example, if the animal receives colostrum after its digestive tract has closed, it may not be able to absorb the rich antibodies included in the colostrum. Even if the animal receives colostrum after the digestive tract has begun to close, it may not be able to absorb as many of the beneficial antibodies. When a newborn animal fails to receive colostrum at the proper time or times, negative consequences to the animal can last for life.

In a farm setting, managing the provision of colostrum to newly-born mammals, such as cattle, can present a considerable challenge. On even moderately sized-operations, there may be multiple animals born on a given day, each on a different schedule of colostrum feeding and associated testing. Further, best practices may include providing multiple colostrum feedings to a newborn at defined intervals after birth, which increases the complexity. Also, the birth and various colostrum feedings for an animal span can easily span multiple technician shifts, requiring communication between individual technicians.

Farm technicians may keep track of colostrum feedings and related activities using a clipboard and paper. Paper-based techniques, however, are error prone and may create communication issues. For example, if a paper indicating a target colostrum feeding time for an animal is lost or destroyed, colostrum feedings can be missed or delayed. Further, paper may not provide a uniform medium for communication between farm technicians working adjacent shifts. When using a paper method, it is necessary for one technician to be able to locate and properly read what was written by the technician on the previous shift. Hurried communication and even poor handwriting can lead to missed colostrum feedings with the associated harm to the health of the livestock.

Farm technicians may also keep track of colostrum feedings using commercially available software tools, such as spreadsheet applications. A spreadsheet may be configured for a farm technician to enter the time of birth for an animal. The spreadsheet application may calculate the times for one or more colostrum feedings or other associated tasks and provide that information to the technician. The technician may also be able to enter times for the colostrum feedings and tests or other associated tasks.

Although the use of a spreadsheet application may mitigate some of the disadvantages of a paper-and-clipboard method, it creates additional problems. For example, the user interface (UI) of a spreadsheet application typically includes a large number of small cells and/or other elements. The spreadsheet UI may be very useful when viewed on a full-sized computer display but much more difficult to operate on a smaller tablet or other mobile device. Accordingly, a farm technician using a spreadsheet technique may need to a use a stationary computing device with a full-sized display to access the spreadsheet. As a result, the information provided may only be available to the technician when the technician is at the computer.

As described herein, the timing and results of colostrum feedings during the first hours and days of an animal's life can affect the animal for life. Accordingly, it may be desirable to use data describing an animal's colostrum feedings and associated tests throughout the animal's life. Colostrum feeding and testing action data recorded via the paper and clipboard method may require a manual data entry step before the data can be available later in the life of the animal. Also, papers and logs can be destroyed or lost before data entry can occur. Spreadsheet methods can also present difficulties. A spreadsheet file may need to be uploaded to a central database before the data therein can be searched or used later in the life of the animal.

Various examples described herein address these and other issues by providing a livestock management system and methods for using the same. The livestock management system can include a server computing device and one or more user computing devices. A first user computing device provides a GUI that may be configured for use on the smaller screen of a tablet, mobile phone, or other mobile computing device. In this way, a farm technician or other user may input information about animal births, colostrum feedings, and associated tests on a mobile device without the need to move to the location of full sized computing device such as a desktop or laptop.

The graphical user interface is configured to provide a birth input screen for receiving birth data describing the birth of an animal. Upon receiving the birth data for an animal, the system determines a target time for the animal's first colostrum feeding (e.g., based on the birth time). The system may display a first animal visual element corresponding to the first animal at the graphical user interface. The first animal visual element may include an indication of a first colostrum feeding of the first animal. The system may determine a target time for the first colostrum feeding, for example, using the birth time of the first animal. The first animal visual element may indicate a time status of the first colostrum feeding of the first animal. The time status indicates a difference between a current time and the target time for a given action. For example, if the target time for the first colostrum feeding is in the future, the first animal visual element may be a first color, such as green. If the target time for the first colostrum feeding is imminent (e.g., within 10 minutes, 15 minutes, etc.), the first animal visual element may be rendered in a second color, such as yellow. If the first colostrum feeding is overdue (e.g., the target time is in the past), the first animal visual element may be rendered in a third color, such as red.

The graphical user interface screen may include a number of animal visual elements corresponding to different animals Each animal visual element may be arranged to indicate the timing of a next action for the animal such as, for example, a first colostrum feeding, a subsequent colostrum feeding, a testing action, etc. The visual elements may be arranged at the screen of the user computing device in order of the actions due for the various animals. For example, the visual element corresponding to the animal with the next scheduled action may be rendered at the top of the screen with visual elements for animals with later scheduled actions ordered below.

When the farm technician or other user performs an action with respect to an animal, such as providing a colostrum feeding and/or performing testing, the user selects the animal visual element for that animal Responsive to receiving the selection of the animal visual element, the user computing device displays an action input screen for receiving data about the action. For example, if the action is a colostrum feeding, the user computing device displays a colostrum feeding screen for receiving data describing the colostrum feeding. If the action is a testing action, such as a protein test or other test, the user computing device displays a testing action screen for receiving data describing the testing.

Birth, colostrum, and testing action data received via the graphical user interface may be provided to the server computing device. The server computing device may store the data for future use. In some examples, the server computing device serves data for generating the graphical user interface to more than one user computing device. For example, a first user may enter birth data for one or more animals at a first user computing device. The system may determine a target time for the animal's first colostrum feeding using the birth data. A second user may view the graphical user interface including the various animal visual elements using a second user computing device. Upon performing a colostrum feeding or testing action with respect to an animal, the second user selects the animal visual element corresponding to that animal to provide the relevant data. In this way, different farm technician users may be provided with access to relevant data and data input functionality without the need for person-to-person coordination.

The livestock management system described herein may also incorporate birth data, colostrum data, and/or testing action data along with bolus data to detect an animal health event and generate an animal health alert message to a user with responsibility for the animal's medical care. A bolus is a device that can be ingested by an animal, such as a cow or other ruminant. In some examples, the bolus is made of or includes a nutrient material that slowly dissolves in the animal's digestive tract as the bolus passes. The bolus also includes one or more sensors that sense conditions at the animal's digestive tract. The bolus can also include an RFID or other suitable wireless communication circuit allowing the bolus to transmit sensor data captured in the animal's digestive tract to an outside device, such as one of the user computing devices described herein.

In various examples, a user computing device initiates a wireless connection with the bolus to receive sensor data from the bolus, such as temperature data describing the temperature at the digestive tract of the first animal, pH data describing the pH of at the animal's digestive tract, heart rate data describing a heart rate of the animal, partial pressure data indicating the partial pressure of dissolved gasses in the animal, motion data indicating a motion of the animal, or other sensor data. The user computing device provides the bolus sensor data to the server computing device as described herein.

The server computing device uses the bolus sensor data along with birth data, first colostrum data, and/or testing action data for the animal to detect a health event. The server computing device may determine that the sensor data indicates a health event for the animal. In response to detecting a health event for the animal, the server computing device sends a health alert message to a user computing device associated with an administrative user. The administrative user may be a farm technician, veterinarian, manager, or other person with responsibility for the animal's health. As described herein, early colostrum feedings, including the timing of the colostrum feedings, may affect an animal's immune system and/or overall health throughout its life. Accordingly, the server computing device may include birth data, colostrum data, and other test data in the alert message. The administrative user may use the birth data, colostrum data, and/or other test data to diagnose and/or treat the animal.

In some examples, the server computing device applies one or more sensor data ranges to the bolus sensor data to detect a health event. If the bolus sensor data is outside of the bolus sensor data range or ranges, the server computing device may detect a health event and send the alert message. The server computing device may also select the sensor data ranges for an animal using the colostrum and/or testing action data for that animal. For example, the server computing device may determine a lower temperature threshold for detecting a health event for an animal that received a late colostrum feeding and/or had testing action data indicating a less effective colostrum feeding.

FIG. 1 is a diagram showing one example of an environment 100 for implementing a computerized livestock management system. The environment 100 includes a livestock management server 102. The livestock management server 102 includes one or more computing devices that may be at a common geographic location or may be distributed across multiple geographic applications. The environment 100 also includes various user computing devices 104A, 104B, 138. The user computing devices 104A, 104B, 138 may be any suitable computing device or devices such as, for example, a smart phone, a tablet computer, a laptop computer, a smart watch, etc. The user computing devices 104A, 104B, 138 may comprise input/output (I/O) devices for providing a graphical user interface (GUI) 132 to the user 120. For example, the user computing devices 104A, 104B, 138 may comprise a display for showing the GUI 132 to the user 120. In some examples, one or more of the user computing devices 104A, 104B, 138 is or comprises a display that is configured to be worn on the user's head, such as a heads-up display, smart glasses display or similar display. In some examples, the GUI 132 is arranged with elements and features, as described herein, that are optimized for display and manipulation by a farm technician user on a mobile user computing device having a smaller screen, such as a tablet or mobile phone.

The livestock management server 102 includes a colostrum management subsystem 126 and a health monitor subsystem 128. The colostrum management subsystem 126 is configured to communicate with one or more of the user computing devices 104A, 104B, 138 to receive colostrum and testing action data describing various animals.

The health monitor subsystem 128 is configured to generate health alerts, for example, based on bolus sensor data. If a health event is detected, the health monitor subsystem 128 may send an alert message 136 to a user computing device 138 associated with an administrative user 124, as described in more detail herein.

In the example of FIG. 1, the user computing device 104A is associated with a user 120, who may be a farm technician managing the birth and/or colostrum feeding of animals 114A, 114B, 114N. In the example of FIG. 1, the animals 114A, 114B, 114N are associated with mothers 112A, 112B, 112N. When the animals 114A, 114B, 114N are calves, the mothers 112A, 112B, 112N may also be referred to as dams.

Upon the birth of an animal 114A, 114B, 114N, the user 120 provides birth data to user computing device 104A. For example, the user computing device 104A may display a birth input screen or screens, such as screens 800 and 900 described in more detail herein with respect to FIGS. 8 and 9. The user 120 enters birth data into the birth input screen, for example, using a touch screen or other I/O device of the user computing device 104A. Birth data can include for example, a time of birth for the animal 114A, 114B, 114N, an identifier of the mother or dam 112A, 112B, 112N, an animal identifier for the animal 114A, 114B, 114N, a weight of the animal 114A, 114B, 114N, a breed of the animal 114A, 114B, 114N, a sex of the animal 114A, 114B, 114N, an ease level of the birth, a type of birth, etc. The user computing device 104A provides the birth data to the livestock management server 102 (e.g., to the colostrum management subsystem 126 thereof). The user computing device 104A and/or the livestock management server 102 determines a target time for a next action (e.g., a first colostrum feeding) for the animal 114A, 114B, 114N.

In some examples, the user 120 also performs one or more other actions with respect to an animal 114A, 114B, 114N such as, for example, providing one or more colostrum feedings, and/or performing a colostrum-related test such as a total protein test. To provide a colostrum feeding, the user 120 retrieves a colostrum cassette 110 or other colostrum container from a refrigeration unit 106. In some examples, the colostrum is prepared from a powered product and the refrigeration unit 106 is not used. The colostrum can be provided to an animal 114A, 114B, 114N via a bottle. If the animal 114A, 114B, 114N declines to take the colostrum in a bottle, the user 120 may provide the colostrum via a tube.

To perform a total protein test, the user 120 may take a blood draw from an animal 114A, 114B, 114N and provide the resulting blood sample to a refractometer 105. The refractometer 105 may measure a total protein content of the blood sample, which may provide an estimate of the immunoglobulin G (IgG) in the blood sample. The total protein or IgG value indicates a level of antibodies in the animal's bloodstream and can indicate how successful the colostrum feedings were in boosting the development of the animal's immune system.

The user computing device 104A and/or livestock management server 102 may utilize the GUI 132 to assist the user 120 in managing the performance of colostrum-related actions including one or more colostrum feedings and test actions, such as a total protein test. The GUI 132 is provided to the user 120 via an input/output (I/O) device of the user computing device 104A such as, for example, a touch screen.

Upon completion of one action with respect to an animal 114A, 114B, 114N, the user computing device may determine a target time for a next action for the animal 114A, 114B, 114N. For example, a first colostrum feeding target time may be a predetermined time (e.g., one hour) after the birth of the animal 114A, 114B, 114N. A second colostrum feeding may be a predetermined time (e.g., 12 hours) after the birth of the animal 114A, 114B, 114N and/or a predetermined time after the first colostrum feeding. A testing action, such as a total protein test, may be a predetermined time after the birth of the animal (e.g., 48 hours) and/or a predetermined time after the second colostrum feeding. Different arrangements of colostrum-related actions may also be used, for example, based on the animal species, current best practices, etc.

In some examples, the user computing device 104A generates the GUI 132. For example, the user computing device 104A may be in communication with the livestock management server 102 (e.g., the colostrum management subsystem 126 thereof). The livestock management server 102 may provide the user computing device 104A with data describing the next actions for the various animals 114A, 114B, 114N. The user computing device 104A may utilize the received data to generate the GUI 132, for example, in the form described herein.

In other examples, the livestock management server 102 (e.g., the colostrum management subsystem 126 thereof) renders the GUI 132 and serves it to the user computing device 104A. For example, the user computing device 104A may execute an application that facilitates the provision of the GUI 132. In some examples, the application is a web browser that communicates with the livestock management server 102 to receive and display the GUI 132. For example, the GUI 132 may be or include a web page displayed at the user computing device 104A via the web browser. Also, in some examples, the application is an application that otherwise communicates with the livestock management server 102. For example, the application may be or include a mobile or other application that includes an embedded web view or other view that receives a web document from the livestock management server 102. Also, although the GUI 132 is shown in association with the user computing device 104A, it will be appreciated that the user computing device 104B and/or user computing device 138 may be configured to generate, render, and/or display the GUI 132 in a similar manner.

The GUI 132 may include visual elements and features that are optimized to assist the user 120 in managing colostrum-related actions for the animals 114A, 114B, 114N. For example, upon receiving birth data for an animal 114A, 114B, 114N, the livestock management server 102 and/or the user computing device 104A may begin tracking one or more colostrum feedings for the animal 114A, 114B, 114N. In some examples, the animal 114A, 114B, 114N receives two colostrum feedings. A first colostrum feeding may be due within a first time period of birth and a second colostrum feeding may be due within a second time period of birth. In some examples, the first colostrum feeding is due within one hour of birth and the second colostrum feeding is due about twelve hours after the first colostrum feeding. A total protein test or other colostrum-related test may be scheduled for a predetermined time after the one or more colostrum feedings. In some examples, various animals 114A, 114B, 114N may be subject to more or fewer test actions and/or colostrum feedings.

The user computing device 104A is configured to provide the GUI 132 to the user 120 to allow the user 120 to track colostrum feeding and/or testing actions due for the animals 114A, 114B, 114N and input relevant data. The GUI 132, in the example form shown in FIG. 1, comprises a number of animal visual elements 131A, 131B, 131C, 131D, 131N. Each of the animal visual elements 131A, 131B, 131C, 131D, 131N corresponds to an animal, such as one of the animals 114A, 114B, 114N. In this example, the animal visual elements 131A, 131B, 131C, 131D, 131N are provided as horizontal bars across a display of the user computing device 104A. Each of the horizontal bar-shaped elements 131A, 131B, 131C, 131D, 131N comprises an animal ID (AID) field indicating an identifier of its corresponding animal, an action field indicating the next action for the animal, and a due field indicating when the next action is due. For example, the animal visual element 131A indicates that for an animal with AID X1, the next action is a first colostrum feeding that is due at a time "TIME 1."

The horizontal bar shape of the animal visual elements 131A, 131B, 131C, 131N may enable a large number of the elements 131A, 131B, 131C, 131D, 131N to be displayed and manipulated on a touch screen of a tablet, mobile telephone, or other mobile computing device, which may have a screen that is commonly-held in a portrait position having greater height than width.

The position, color and/or other qualities of the animal visual elements 131A, 131B, 131C, 131N may provide the user 120 with information to track the next colostrum-related action for various animals 114A, 114B, 114N. For example, the color of the animal visual element 131A, 131B, 131C, 131D, 131N for an animal may indicate a time status of the next action for that animal, where the time status is based on a difference between the current time ant the target time for the next action. In FIG. 1, the animal visual element 131A is a first color indicating that the target time next action for the corresponding animal has past and the next action is overdue. For example, the animal visual element 131A may be red. The animal visual element 131B is a second color indicating that the target time for the next action for the corresponding animal is imminent, but not overdue. For example, the animal visual element 131B may be yellow. The animal visual elements 131C, 131D, 131N are a third color indicating that the next action for the corresponding animals is currently on-time (e.g., the target time for the next action is more than a threshold time in the future). For example, the animal visual elements 131C, 131D, 131N may be green.

In some examples, the order of the animal visual elements 131A, 131B, 131C, 131D, 131N at the GUI 132 may also indicate the time status of the next actions for the corresponding animals. For example, the user computing device 104A may display the elements 131A, 131B, 131C, 131D, 131N from top to bottom in order of urgency, with animal visual elements 131A, 131B, 131C, 131D, 131N having next actions that are most imminent and/or overdue at the time.

The user 120 may select an animal visual element 131A, 131B, 131C, 131D, 131N to record an action taken with respect to an animal and/or to facilitate the action. When an animal visual element 131A, 131B, 131C, 131D, 131N is selected, the user computing device 104A displays a data input screen corresponding to the next action for the corresponding animal. For example, if the animal visual element 131A is selected, the user computing device 104A may display a colostrum input screen for receiving data about a first colostrum feeding because the next action for the animal corresponding to the animal visual element 131A is a first colostrum feeding. Similarly, if the user 120 selects the animal visual element 131D, the user computing device 104A may display a testing action input screen because the next action for the animal corresponding to the animal visual element 131D is a total protein test.

At a colostrum input screen, the user 120 provides colostrum data including, for example, an animal identifier of the animal, a Brix measurement for the colostrum used, an identifier of the colostrum cassette used, a method used for providing the colostrum, a date and time of the feeding, a type of colostrum used (e.g., pasteurized versus replacer), etc. The colostrum data can be provided by the user 120 directly into the colostrum input screen, for example, using a touch screen or other input device of the user computing device 104A. Example colostrum input screens are provided herein at FIGS. 13 & 14.

In some examples, the user computing device 104A receives some or all of the colostrum data from one or more other devices. For example, the user computing device 104A may be in wireless communication with the refrigeration unit 106 and/or the colostrum cassette or other colostrum container to receive information about the colostrum provided to an animal including, for example, the type of colostrum, the Brix value of the colostrum, etc. Also, in some examples, the user computing device 104A may be in wireless communication with an ear tag or other wireless device coupled to an animal 114A to receive the animal identifier of the animal.

Any suitable type of wireless communication may be used between the user computing device 104A and the refrigeration unit 106, colostrum cassette 110 or other colostrum container and/or animal 114A. In some examples, one or more of the refrigeration unit 106, colostrum cassette 110 or other colostrum container and/or tag associated with the animal 114A comprises a radio frequency identifier (RFID) device. The user computing device 104A may comprise or be in communication with an RFID reader to wirelessly communicate with the various devices. In another environment, one or more of the devices 106, 110 and or a tag or other device associated with the animal 114A may comprise components for utilizing a short range wireless communication medium such as, for example, Near Field Communication (NFC), Bluetooth®, etc. The devices may communicate with the user computing device 104A using the short range wireless communication device.

In some examples, one or more of the colostrum cassette 110, other colostrum container, or the animal 114A comprise a visual code, such as a bar code or quick response (QR) code having some or all of the colostrum data encoded therein. For example, the colostrum cassette 110 may have a visual code indicating the source of the colostrum, the Brix of the colostrum, etc. The animal 114A may be wear an ear tag or other tag including a visual code that encodes the animal identifier for the animal. The user computing device 104A may utilize an image sensor to capture one or more images of a visual code on a colostrum cassette 110, animal ear tag, or other location to receive colostrum data.

In some examples, the colostrum input screen comprises an import button. The import button may be selected by the user 120 to instruct the user computing device 104A to import some or all of the colostrum data from an external device. For example, in response to the selection of the import button, the user computing device 104A may initiate a wireless communication with a colostrum cassette 110, refrigeration unit 106, and/or tag at the animal 114A via an RFID or other wireless protocol. In some examples, selecting the import button may prompt the user computing device to use an image sensor to capture an image of an external device, such as, for example, a visual code printed on a colostrum cassette 110 and/or a tag at the animal 114A.

When the user 120 enters colostrum data from a colostrum feeding, the user computing device 104A provides the resulting colostrum data to the livestock management server 102 (e.g., the colostrum management subsystem 126 thereof) for storage at the database 130. The user computing device 104A and/or the livestock management server 102 may modify the animal visual element of the corresponding animal to indicate a time status of a new next action such as, for example, a second or additional colostrum feeding, a testing action, etc.

When the next action is a testing action, the user 120 may select the animal visual element again to complete the testing action and/or enter testing action data describing the first testing action data. The testing action data may include, for example, a total protein value derived from a blood sample, an animal identifier, or any other suitable data. The user 120 may enter the testing action data directly, for example, via a touch screen or other input device of the user computing device 104A. Also, in some examples, the user computing device 104A may initiate a wireless connection to the refractometer 105 or other testing equipment used to perform the test. The wireless connection may be, for example, an RFID connection, a short range wireless communication connection, or any other suitable connection.

The environment 100 of FIG. 1 also includes animals 116A, 116B, 116N that have ingested respective boluses 118A, 118B, 118N. The boluses 118A, 118B, 118N. The boluses 118A, 118B, 118N include one or more sensors, such as temperature sensors, pH sensors, etc. The boluses 118A, 118B, 118N may also include a wireless communication circuit, such as an RFID circuit, for communicating with the user computing device 104B in use by a user 122, who may also be a farm technician.

In this example, the animals 116A, 116B, 116N were managed by the colostrum management subsystem 126 at birth or the database 130 otherwise contains birth data and colostrum data for the respective animals 116A, 116B, 116N. The user 122 may utilize the user computing device 104B to initiate a wireless connection between the user computing device 104B and one or more of the boluses 118A, 118B, 118N to receive sensor data captured by the boluses 118A, 118B, 118N. The sensor data may be provided to the livestock management server 102 (e.g., the health monitor subsystem 128 thereof). The health monitor subsystem 128 may analyze the sensor data to detect a health event for one or more of the animals 116A, 116B, 116N.

The sensor data received by the health monitor subsystem 128 may include temperature data indicating a temperature of the animals 116A, 116B, 116N, pH data indicating the pH at the animals 116A, 116B, 116N or other suitable data. The health monitor subsystem 128 may detect a health event, for example, when the sensor data received from an animal 116A, 116B, 116N is outside of a temperature range. If a health event is detected, the health monitor subsystem 128 sends an alert message 136 to the user computing device 138 of an administrative user 124. The administrative user 124 may be a veterinarian, manager, farm technician, or other person who is in a position to examine the afflicted animal 116A, 116B, 116N and provide treatment if necessary.

The alert message 136 may include alert data 134 including, for example, an animal identifier of the afflicted animal 116A, 116B, 116N, colostrum data collected from the animal 116A, 116B, 116N, protein data collected from the animal 116A, 116B, 116N after one or more colostrum feedings and the temperature data received from the bolus 118A, 118B, 118N.

In some examples, the health monitor subsystem 128 determines one or more sensor data ranges used to detect a health event based on the colostrum and/or total protein data on record for an animal 116A, 116B, 116N. For example, if the animal 116A, 116B, 116N received its colostrum feedings on time and had an acceptable total protein level, one temperature range may be used. If, on the other hand, the animal 116A, 116B, 116N received its colostrum feedings late and had a low total protein level, a second temperature range may be used, where the second temperature range is smaller than the first temperature range. In this way, animals 116A, 116B, 116N that did not receive colostrum feedings on time and/or had low total protein scores may be determined to be experiencing a health event with a smaller temperature deviation than other animals.

Figure 2:
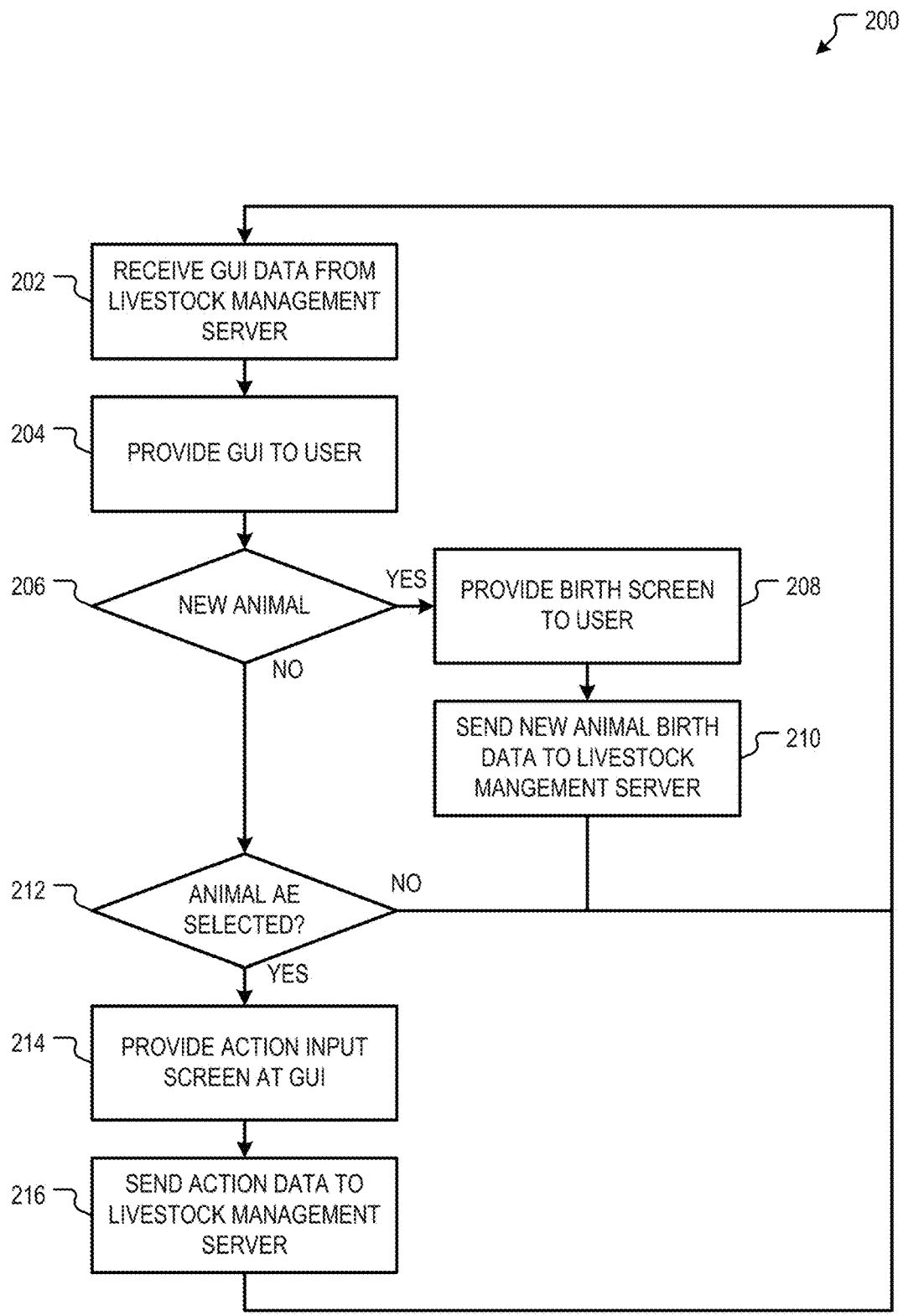
FIG. 2 is a flowchart showing one example of a process flow that may be executed in the environment of FIG. 1 to gather colostrum data and testing data for a first animal.

FIG. 2 is a flowchart showing one example of a process flow 200 that may be executed in the environment 100 by a user computing device, such as one of the user computing devices 104A, 104B to gather colostrum data and testing action data for a first animal. The user computing device executing the process flow 200 may be associated with a user, such as a farm technician user who is managing the birth, colostrum feeding(s), and/or testing actions for an animal.

At operation 202, the user computing device receives GUI data from the livestock management server. The user computing device may request the GUI data and/or in some examples, the livestock management server may push the GUI data to the user computing device. In some examples, the GUI data includes data about various animals. The user computing device processes the data and generates the GUI therefrom. In some examples, the livestock management server pre-generates all or part of the GUI and serves the pre-generated GUI to the user computing device.

At operation 204, the user computing device provides the GUI to the user. For example, the user computing device may comprise a display and may display the GUI, including various visual elements, at the display. The user may provide input through the GUI using an input device of the user computing device such as, for example, a touch screen. The GUI displayed at operation 204 may comprise a number of animal visual elements. Each animal visual element may indicate an animal, a next action to be performed for the animal, and a time status of the next action.

The visual element for an animal can indicate time status of the next action for that animal in various different ways. In some examples, an animal element includes alphanumerical characters indicating when the next action for the corresponding animal is due. In some examples, the color of an animal element indicates when the next action for that animal is due. For example, if the next action for an animal is more than thirty minutes away, the corresponding animal element may be green. If the next action is less than thirty minutes away, the corresponding animal element may be yellow. If the next action is overdue, the corresponding animal element may be red. Other coloring schemes to indicate the time status of the next action may also be used. In some examples, the arrangement of animal elements at the GUI indicates the time status of the next action for the first animal. For example, animals with next actions that are most urgent may be rendered at the top of the display, with other animal elements positioned below in order of urgency.

At operation 208, the user computing device determines whether the user has prompted the user computing device to receive birth data describing the birth of an animal. For example, the GUI provided at operation 204 may include a new animal button element that, when selected by the user, prompts the user computing device to receive birth data.

If the user has prompted the computing device to receive birth data, the user computing device provides a birth input screen at a display of the user computing device at operation 208. The birth input screen may comprise fields for receiving birth data such as, for example, a time of birth for the first animal, an identifier of the mother or dam, an animal identifier for the first animal, a weight of the first animal, a breed of the first animal, a sex of the first animal, an ease level of the birth, a type of birth, etc. In some examples, the birth input screen comprises an import button that, when selected, prompts the user computing device to import some or all of the birth data from another device. For example, the user computing device may import the animal identifier from an RFID or other device included on a tag for the animal. At operation 210, the user computing device sends the new animal birth data to the livestock management server and returns to operation 202, where the user computing device receives new GUI data from the livestock management server and operation 204 where the user computing device displays the new GUI.

The GUI displayed at operation 204 after the receipt of birth data for a new animal includes an animal visual element for the animal whose birth was recorded at operations 208 and 210. The animal visual element for the new animal indicates a time status of a next action for the first animal, which may be a first colostrum feeding. The first colostrum feeding may be scheduled for a first time after the birth of the animal such as, for example, within one hour of birth. In some examples, because the first colostrum feeding is scheduled to occur soon after the animal's birth, the animal visual element for the new animal may initially be rendered in a color, such as yellow, to indicate that the next action is imminent.

If the user does not prompt the user computing device to receive new animal data at operation 206, the user computing device determines at operation 212 whether the user has selected one of the animal visual elements at the GUI. The user may select an animal visual element, for example, by applying pressure to a screen of the user computing device at a location where the animal visual element appears. If the user has not selected an animal visual element at operation 206, the user computing device returns to operation 202 to receive updated GUI data from the livestock management server and to operation 204 to provide the updated GUI to the user. The updated GUI, in some examples, includes modifications to one or more animal visual elements to indicate updated time statuses. For example, the user computing device may change the color of an animal visual element if the urgency of the next action for that animal has changed. Also, the user computing device may change the ordering of the animal visual elements if actions for the animal other animals have been completed since the previous rendering of the GUI.

If, at operation 212, the user selects the first animal element, the user computing device responds by displaying an action input screen at operation 214. The action input screen includes fields for receiving data about the next action for the animal corresponding to the selected animal visual element. For example, if the next action is a colostrum feeding, the user computing device displays a colostrum input screen for receiving colostrum data. The colostrum input screen includes input fields for receiving colostrum data such as, for example, a Brix measurement for the colostrum used, an identifier of the colostrum cassette used, a method used for providing the colostrum, a date and time of the feeding, a type of colostrum used (e.g., pasteurized versus replacer), etc. In some examples, the colostrum input screen comprises an import button that can be selected by the user to prompt the user computing device to import some or all of the colostrum data from another device, as described herein. Example colostrum input screens are provided herein at FIGS. 12 & 13.

If the next action is a testing action, such as a total protein test, the user computing device may provide a testing action input screen. The testing action input screen may include fields for receiving data describing the testing action. For example, when the testing action is a total protein test, the testing action input screen may include a field for receiving the total protein. The testing action input screen may also include an import button that can be selected by the user to prompt the user computing device to import some or all of the testing action data from another device, such as a refractometer as described herein.

At operation 216, the user computing device sends testing action data received via the action input window at operation 214 to the livestock management server. Upon sending the action data to the livestock management server, the user computing device returns to operation 202 and receives GUI data from the livestock management server and provides an updated GUI to the user at operation 204. The updated GUI may include a change to the selected animal visual element reflecting the action data provided to the livestock management server at operation 216. For example, the user computing device and/or livestock management server may determine a next action for the corresponding animal. The animal visual element for the animal may be updated to indicate the new next action and a time status of the new next action. If there is no scheduled next action for the animal, then the updated GUI may omit an animal visual element for that animal.

In some examples, the process flow 200 is executed by a single computing device and a single user. In other examples, however, it may not be necessary for the same user or even the same user computing device to perform each action with respect to a single animal. For example, there may be multiple user computing devices executing the process flow 200 of FIG. 2. Each user computing device may be associated with a different user. In some examples, the same user may use more than one of the user computing devices. For example, a user computing device may be positioned at a birthing station allowing a user to enter birth data. A different user computing device may be positioned at a colostrum feeding statin allowing a user to enter colostrum data. Yet another user computing device may be positioned at a total protein testing station allowing a user to enter testing action data.

Figure 3:
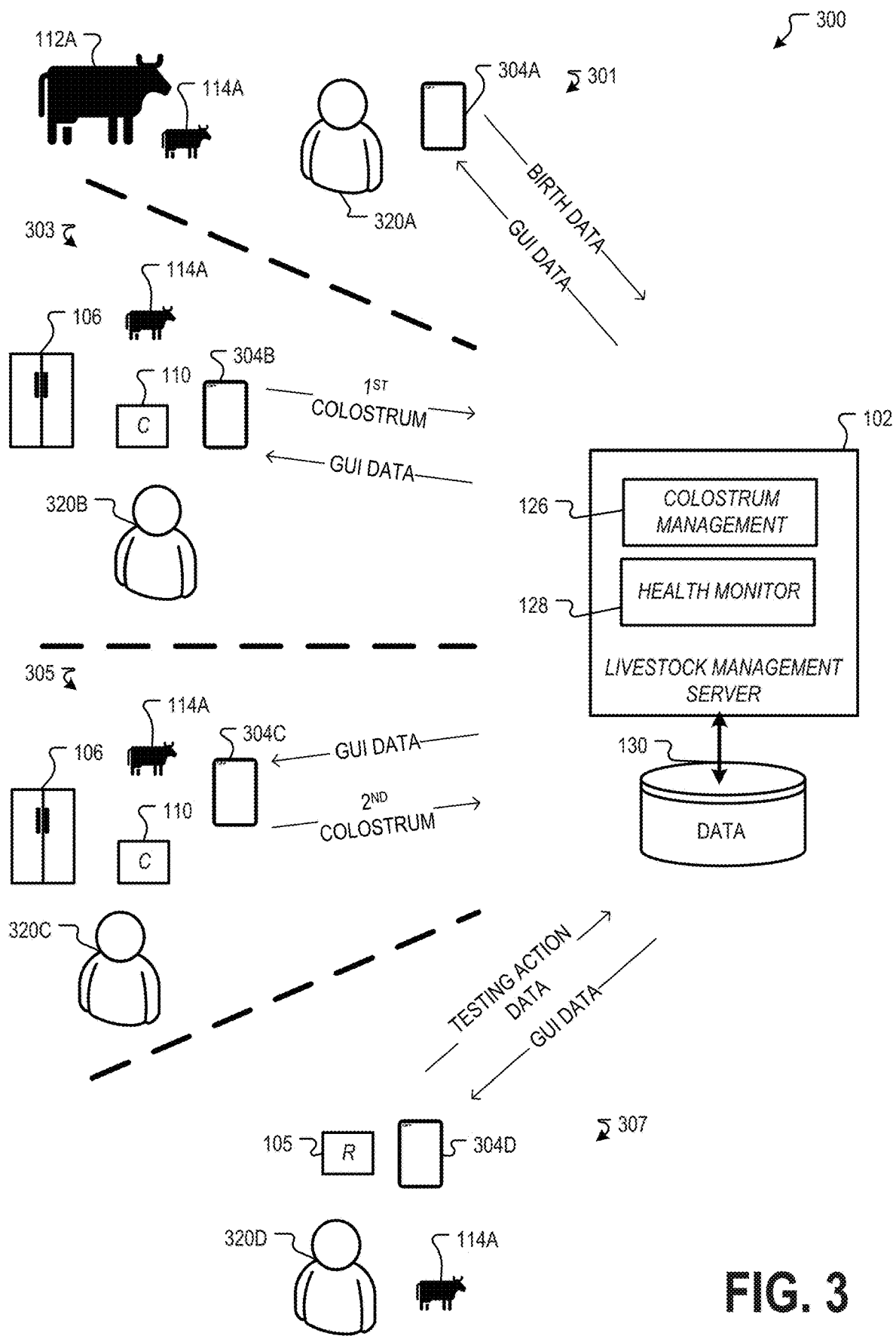
FIG. 3 is a diagram showing a workflow illustrating how actions for a single animal can be performed by different users using different user computing devices.

FIG. 3 is a diagram showing a workflow 300 illustrating how actions for a single animal 114A can be performed by different users 320A, 320B, 320C, 320D using different user computing devices 304A, 304B, 304C, 304D. In this example, there are three scheduled actions for the animal 114A. After a birth event 301, the animal 114A is scheduled for a first colostrum feeding 303, a second colostrum feeding 305 and a testing action 307, which may be a total protein test. In other embodiments, there may be different actions specified for the animal 114A. For example, the animal may be subjected to more or fewer colostrum feedings, more or fewer testing actions, different testing actions, combinations of different colostrum feedings and testing actions, etc. Also, in this example, each action 301, 303, 305, 307 is performed by a different user 320A, 320B, 320C, 320D and different user computing device 304A, 304B, 304C, 304D. In various examples, however, some users and user computing devices are used for more than one action in various different permutations.

In the example of FIG. 3, each of the user computing devices 304A, 304B, 304C, 304D executes the process flow 200 of FIG. 2. At the birth event 301, the user 320A may prompt the user computing device 304A to receive birth data (operation 206). The user 320A may provide the birth input screen to the user (operation 208). The user 320A may provide the birth data to the user computing device 304A via the birth input screen. The user computing device 304A may send the birth data to the livestock management server 102 (operation 210) and receive new GUI data from the livestock management server 102 (operation 202) and display an updated GUI (operation 204). The updated GUI may include a first animal visual element for the animal 114A. The first animal visual element for the animal 114A indicates a time status of the first colostrum feeding 303 for the animal 114A.

The first colostrum feeding 303, in this example, is performed by a second user 320B using a second user computing device 304B. The second user computing device 320B receives GUI data from the livestock management server 102 (operation 202) and displays the GUI to the user 320B (operation 204). The GUI may include the first animal visual element for the animal 114A including the time status of the first colostrum feeding 303. The user 320B may select the first animal visual element for the animal 114A (operation 212). In response, the user computing device 304B provides a first colostrum input screen to the user 320B (operation 214). The user 320B enters first colostrum data, as described herein. In some examples, as described herein, the first colostrum data is received in whole or in part from the refrigeration unit 106 and/or the colostrum cassette 110 used for the first colostrum feeding. The user computing device 304B provides the first colostrum data to the livestock management server 102 (operation 216).

The second colostrum feeding 305, in this example, is performed by a third user 320C using a third using computing device 304C. The third user computing device 320C receives GUI data from the livestock management server 102 (operation 202) and displays the GUI to the user 320C (operation 204). The GUI may include the first animal visual element for the animal 114A including the time status of the second colostrum feeding 305. The user 320C may select the first animal visual element for the animal 114A (operation 212). In response, the user computing device 304C provides a second colostrum input screen to the user 320C (operation 214). The user 320C enters second colostrum data, as described herein. In some examples, as described herein, the second colostrum data is received in whole or in part from the refrigeration unit 106 and/or the colostrum cassette 110 used for the second colostrum feeding. The user computing device 304C provides the second colostrum data to the livestock management server 102 (operation 216).

The testing action 307, in this example, is performed by a fourth user 320D using a fourth user computing device 304D. The fourth user computing device 320D receives GUI data from the livestock management server 102 (operation 202) and displays the GUI to the user 320D (operation 204). The GUI may include the first animal visual element for the animal 114A including the time status of the testing action 307. The user 320D may select the first animal visual element for the animal 114A (operation 212). In response, the user computing device 304D provides a testing action input screen to the user 320D (operation 214). The user 320D enters testing action data, as described herein. In some examples, the testing action data is received in whole or in part from the refractometer 105. The user computing device 304D provides the testing action data to the livestock management server 102 (operation 216).

Figure 4:
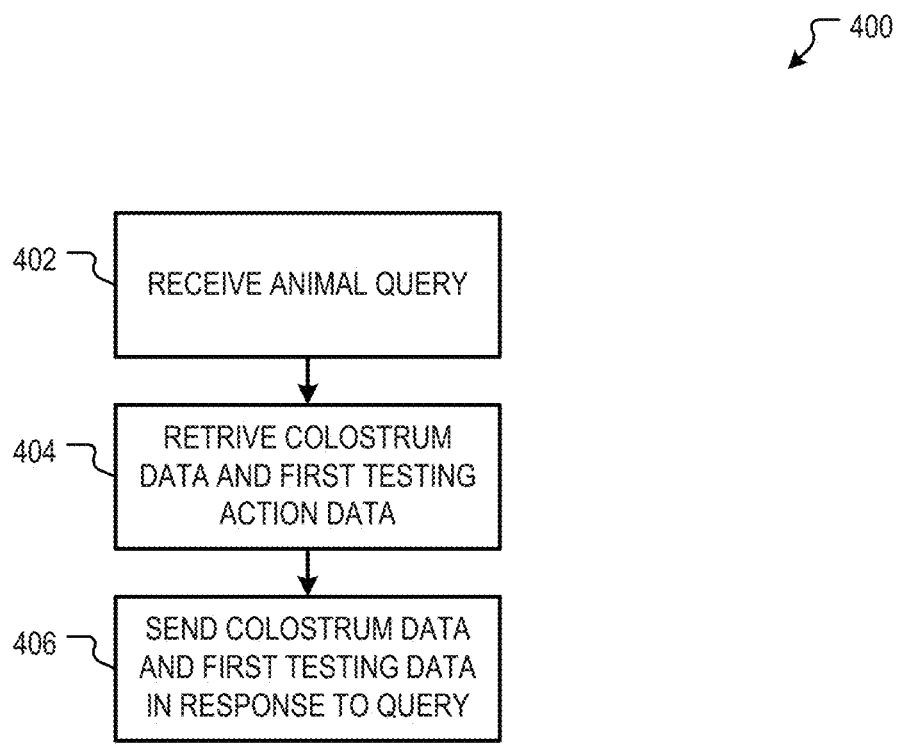
FIG. 4 is a flowchart showing one example of a process flow that may be executed by the livestock management server of FIG. 1 to utilize colostrum and/or testing action data to manage the health of an animal.

FIG. 4 is a flowchart showing one example of a process flow 400 that may be executed by a livestock management server such as the livestock management server 102 and/or the health monitor subsystem 128 thereof, to utilize colostrum and/or testing action data to manage the health of an animal. At operation 402, a livestock management server receives an animal query from a user computing device, such as the user computing device 138. The animal query may be made by an administrative user, such as a veterinarian or manager or other personnel with responsibility for diagnosing and/or treating health problems with animals. For example, an administrative user may make the query about an animal that is exhibiting health symptoms. At operation 404, the livestock management server retrieves colostrum data and testing action data for the animal indicated by the query. The colostrum and/or testing action data may have been received in the manner described herein. At operation 406, the livestock management server sends a response to the query including, for example, colostrum data from one or more colostrum feedings and/or testing action data from one or more testing actions, such as protein data describing a protein test.

Figure 5:
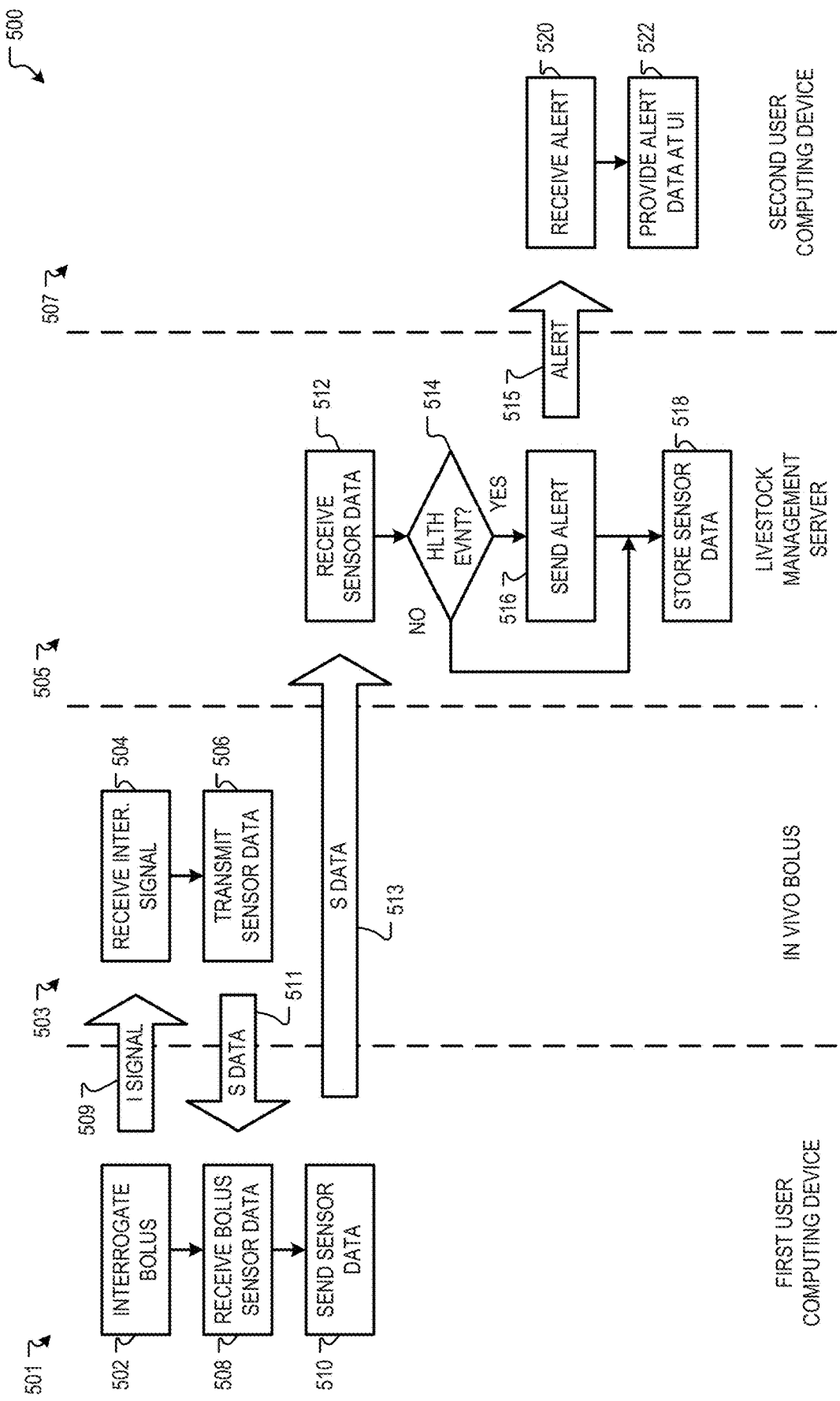
FIG. 5 is a flowchart showing one example of a process flow that may be executed in an environment such as the environment of FIG. 1 to detect animal health events and alert an administrative user.

FIG. 5 is a flowchart showing one example of a process flow 500 that may be executed in an environment such as the environment 100 of FIG. 1 to detect animal health events and alert an administrative user. The process flow 500 includes four columns 501, 503, 505, 507 including actions performed by four components. The column 501 includes actions that may be performed by a first user computing device, such as the user computing device 104B of FIG. 1. The column 503 includes actions that may be performed by an in vivo bolus present in the digestive tract of a cow, such as one of the boluses 118A, 118B, 118N of FIG. 1. The column 505 includes actions that may be performed by a livestock management server, such as the livestock management server 102 of FIG. 1 or the health monitor subsystem 128 thereof. The column 507 includes actions that may be performed by a second user computing device, such as the user computing device 138 of the administrative user 124 of FIG. 1.

At operation 502, the first user computing device interrogates the bolus ingested by a first animal. For example, the bolus may comprise an RFID circuit, as described herein. Interrogating the bolus may include sending an interrogation signal 509 to the bolus. The bolus receives the interrogation signal 509 at operation 504. At operation 506, the bolus replies by sending sensor data 511 to the first user computing device. The sensor data 511 includes data captured by at least one sensor at the bolus such as, for example a temperature sensor, a pH sensor, a heart rate sensor, a partial pressure sensor, an accelerometer or other motion sensor, etc. The first user computing device receives the sensor data at operation 508 and, at operation 510, sends the sensor data 513 to the livestock management server.

The livestock management server receives the sensor data at operation 512. At operation 514, the livestock management server determines if the sensor data indicates a health event. A health event may be detected, for example, if the sensor data is outside of one or more health event ranges. In some examples, as described herein, the livestock management server determines the sensor data range or ranges using colostrum data and/or testing action data (e.g., total protein data) on record for the animal. If no health event is detected, the livestock management server stores the receives sensor data at operation 518. If a health event is detected at operation 514, the livestock management server, at operation 516, sends an alert message 515 to the second user computing device. The livestock management server may also store the sensor data at operation 518.

The second user computing device receives the alert message 515 at operation 520. The alert message may include, for example, an animal identifier of the relevant animal, colostrum data describing at least one colostrum feeding of the animal, and the temperature or other sensor data received from the bolus. The second user computing device provides the alert message to the administrative user at operation 522, for example, by displaying some or all of the data from the alert message at a user interface at the second user computing device. The administrative user may utilize the alert message 515 as a prompt to examine and potentially treat the animal.

Figure 6:
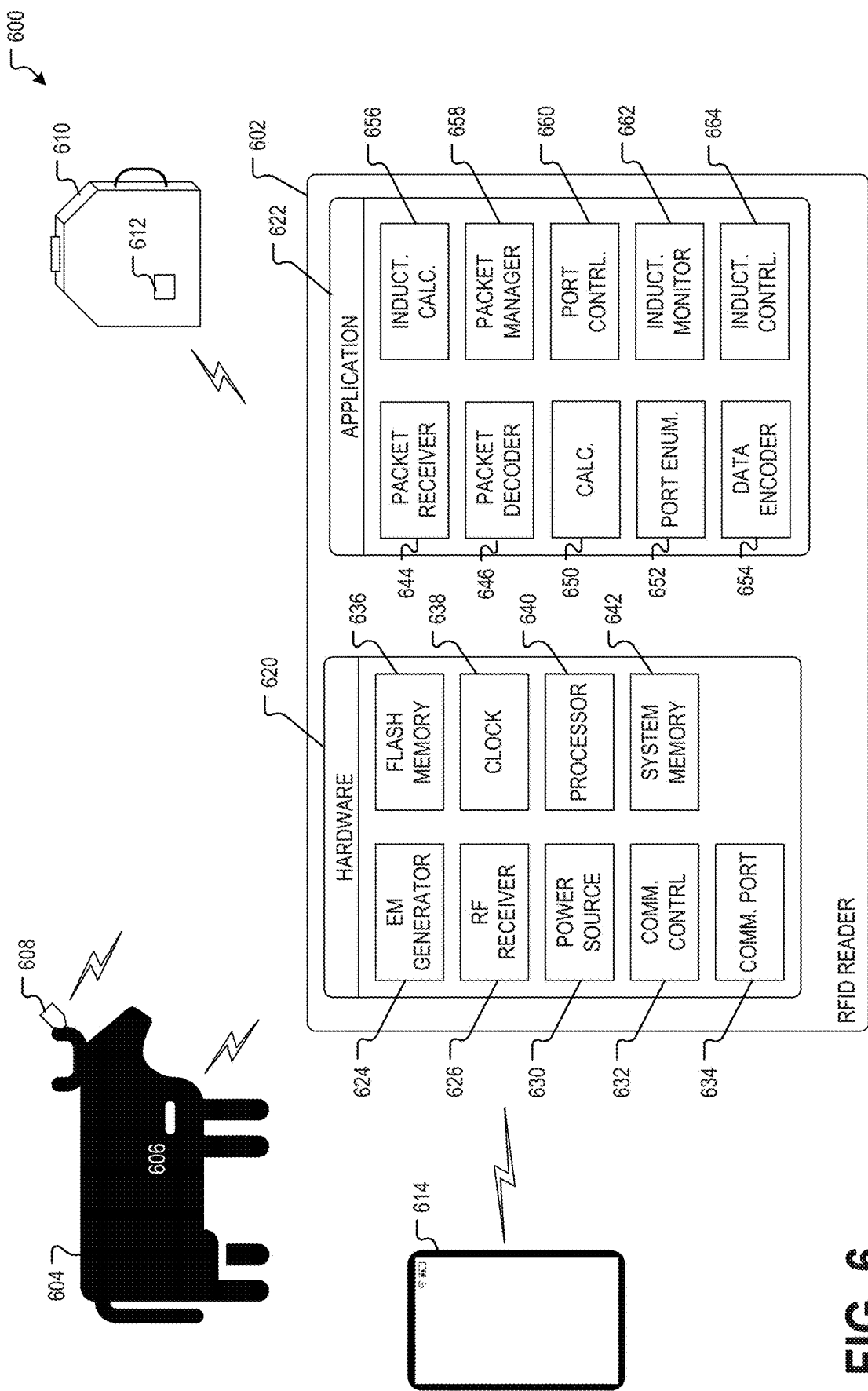
FIG. 6 is a diagram of an environment including a radio frequency identifier (RFID) reader in communication with various RFID devices.

FIG. 6 is a diagram of an environment 600 including an RFID reader 602 in communication with various RFID devices. In some examples, the RFID reader 602 is a component of a user computing device. In other examples, the RFID reader 602 is in communication with a user computing device 614 via a wired or wireless connection. The RFID reader 602 may be configured to wirelessly communicate with various RFID devices. For example, a bolus 606 ingested by an animal 604 may provide sensor data to the RFID reader 602, as described herein. An animal tag 608 on the animal 604 may provide animal identifier data. An RFID device 612 on a colostrum cassette 610 may provide data about colostrum stored at the cassette 610.

Referring now to the RFID reader 602 may transmit a radio-frequency carrier signal to one or more of the RFID devices 606, 608, 612 (or another RFID device as described herein). The RFID may respond to the radio-frequency carrier signal with a RFID data signal to send and receive an amount of RFID information from the RFID device.

The RFID reader 602 may include hardware 620 and an RFID reader application 622, which may be stored in a memory of the RFID reader 602 as firmware. The hardware 620 may include a processor 640 and system memory 642. The hardware 620 may also include an electromagnetic field generator 624 which comprises an electromagnetic drive antenna for transmitting radio frequency signals. The electromagnetic field generator 624 manages the power level and induction of the electromagnetic drive antenna. In various examples, the electromagnetic drive antenna has an inductance between about 3.5 H and about 4.5 H with a 1-to-4 twist. The hardware 620 may also include a radio frequency signal receiver 626 including a receiving antenna. The radio frequency signal receiver manages the receiving antenna, which collects the RFID information sent by the various RFID devices 606, 608, 612. In another example, the EM generator 624 and radio frequency receiver are consolidated into a single component using a common antenna.

The RFID reader hardware 620, can further include a RFID reader processor 640 which can perform computations based on information 701 and calibration data 703 received from the various RFID devices 606, 608, 612. (See FIG. 7) A first RFID reader memory 636 can store the amount of RFID information 701 transmitted from the RFID devices 606, 608, 612. In an alternative the RFID reader processor 640 can integrally include the first RFID reader memory 636. A second RFID reader memory 642 used by the RFID reader processor 640 can perform read-write functions.

The hardware 620 can further include a communication controller 632 which provides communication with the livestock management server 706 and/or user computing device 614 via a local area network (LAN) or wide area network (WAN); a LAN port or a WAN port 634 for wired or wireless connection to the livestock management server 706 and/or user computing device 614. In alternate embodiment the RFID reader processor 640 can be programmed to further provide the functionalities of the communication controller 632.

A clock 638 can function to govern timing of events controlled by the RFID reader processor 640 and may couple a date-time stamp to the amount of RFID information 701. A RFID reader power source 630 may include a voltage regulator to provide, for example, a potential of 12 volts and a direct current in the range of 3.5-4.5 amperes.

The RFID reader application 622 The RFID reader 602 may include modules which can be stored in the first RFID reader memory 636 of the RFID reader 602 (or could be located in the livestock management server 706 or in the user computing device 614. The RFID reader application 622 stored and implemented by the hardware described herein can include an electromagnetic induction monitor module 662 which functions to monitor current inductance levels in the electromagnetic drive antenna. An electromagnetic inductance calculator module 656 may function to compare current electromagnetic inductance levels to a target electromagnetic inductance level. An electromagnetic inductance controller 664 may function to adjust current electromagnetic inductance level toward the target electromagnetic inductance level.

A packet receiver module 644 receives the RFID data signal transmitted with the radio-frequency carrier signal from the RFID devices 606, 608, 612. The receiver module 644 can be activated by detection of movement of an RFID device 606, 608, 612 in the electromagnetic field generated by the electromagnetic field generator 624. The receiver module 644 transfers the RFID data signal which can be decoded by a decoder module 646. The decoder module 646 can be activated by the receiver module 644 and can further function to separate RFID information 701 from a plurality of bit segments 708, 709, 710, 714 received from an RFID device 606, 608, 612. The decoder encoder module 646 can as to certain RFID information 701 activate a RFID reader calculator module 650 to perform calculation functions and generate RFID object characteristic values 722 from sensed RFID object information 716. A data encoder module 654 may function to assemble transmitted RFID information 701 of the bit segments 708, 709, 710, 714 received from an RFID device 606, 608, 612. The data encoder 654 may also transfer data packets output from the RFID reader data encoder module 654. A serial packet manager 648 may handle data packets output from the data encoder module 654 to the communication port 634 for LAN or WAN transmission. A communication port enumerator module 652 functions to assign communication port information for a port controller module 660 which functions to control communications between the reader 602 and the livestock management server 706 and/or the user computing device 614.

Figure 7:
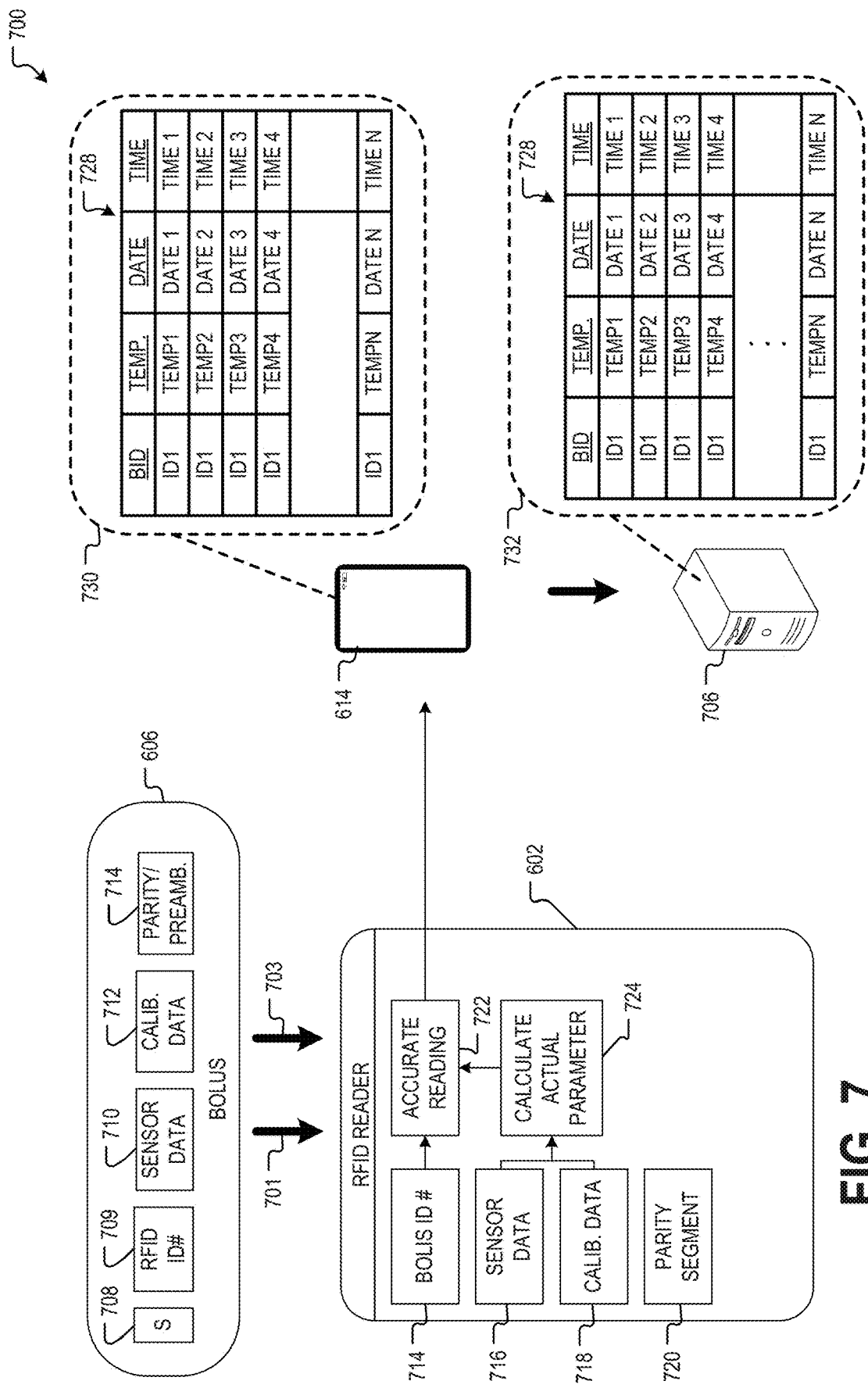
FIG. 7 is a workflow diagram showing one example of RFID data being transferred from an RFID device to a livestock management server via a user computing device.

FIG. 7 is a workflow diagram 700 showing one example of RFID data being transferred from an RFID device (in this example the bolus 606) to the livestock management server 706 via the user computing device 614. In this example, the bolus 606 includes a RFID circuit, for example, located in a hollow inside the bolus 606. The RFID circuit comprises a first bit segment that can be encoded or re-encoded with an amount of RFID object identification 709 information (which can be a bolus identification number, animal identifier, and/or the like). A second bit segment of the RFID circuit can be encoded or re-encoded from time to time with sensed RFID object characteristics 710 received from a sensor at the bolus 606, such as a temperature sensor. Other sensed characteristics may include, for example, location, temperature, pH, heart rate, blood pressure, partial pressures of dissolved gases, or the like. Variation of the sensed RFID object characteristic(s) 710 can be continuously or intermittently updated by encoding or re-encoding the second bit segment 710 of the RFID circuit. A third bit segment of the RFID circuit can be encoded or re-encoded from time to time with an amount of calibration data 712 which allows a RFID object characteristic value 722 to be calculated from the sensed RFID object characteristic 710.

The RFID object identification information 709, the sensed RFID object characteristics 710, and the amount of calibration data 712 can be collected from the corresponding bit segments of the RFID circuit by the RFID reader 602 when the RFID object, in this example, the bolus 606, passes within sufficiently close proximity of the RFID reader 602. As to certain examples of the RFID reader 602 the RFID object identification 709 information and the sensed RFID object characteristics at sensor data 710 and the calibration data 712 can be received by the RFID reader 602 and coupled to a time-date stamp 728 (which for example can take the form of HH:MM:SS and MM/DD/YY). An actual parameter 724 is determined from the sensor data 716 and the calibration data 718. The RFID object characteristic value 722 can be calculated by operation of a RFID reader calculator module 650 having a location in the RFID reader 602 or in the livestock management server 706 or the user computing device 614 (as to certain embodiments) using the sensed RFID object characteristic 650 and the calibration data 712. A parity segment 720 can be located at the beginning and the end of the RFID information 701 from a plurality of bit segments 708, 709,710, 712, 714 to identify the start and the stop of the RFID information 701.

The RFID object identification information 709 and the sensed RFID object characteristics value 722 can be separated, sorted, and loaded into a current reads database table 730 stored in the user computing device 614. The user computing device 614 may provide the values stored at the current reads database table 730 to the livestock management server 706, where they may be stored at a database table 732 of a datastore, such as the datastore 130 of FIG. 1, for later use, as described herein.

Figure 8:
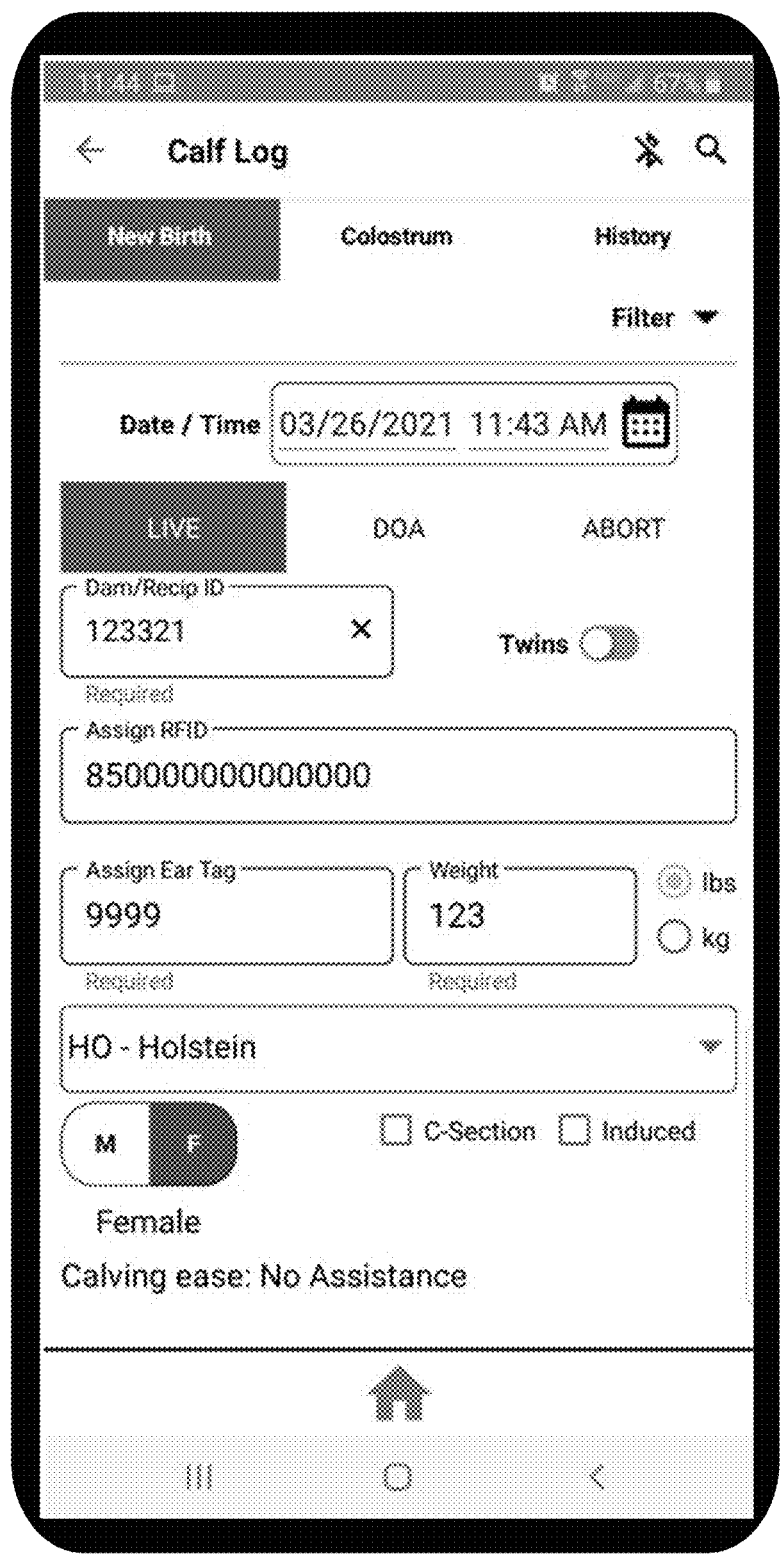
Figure 9:
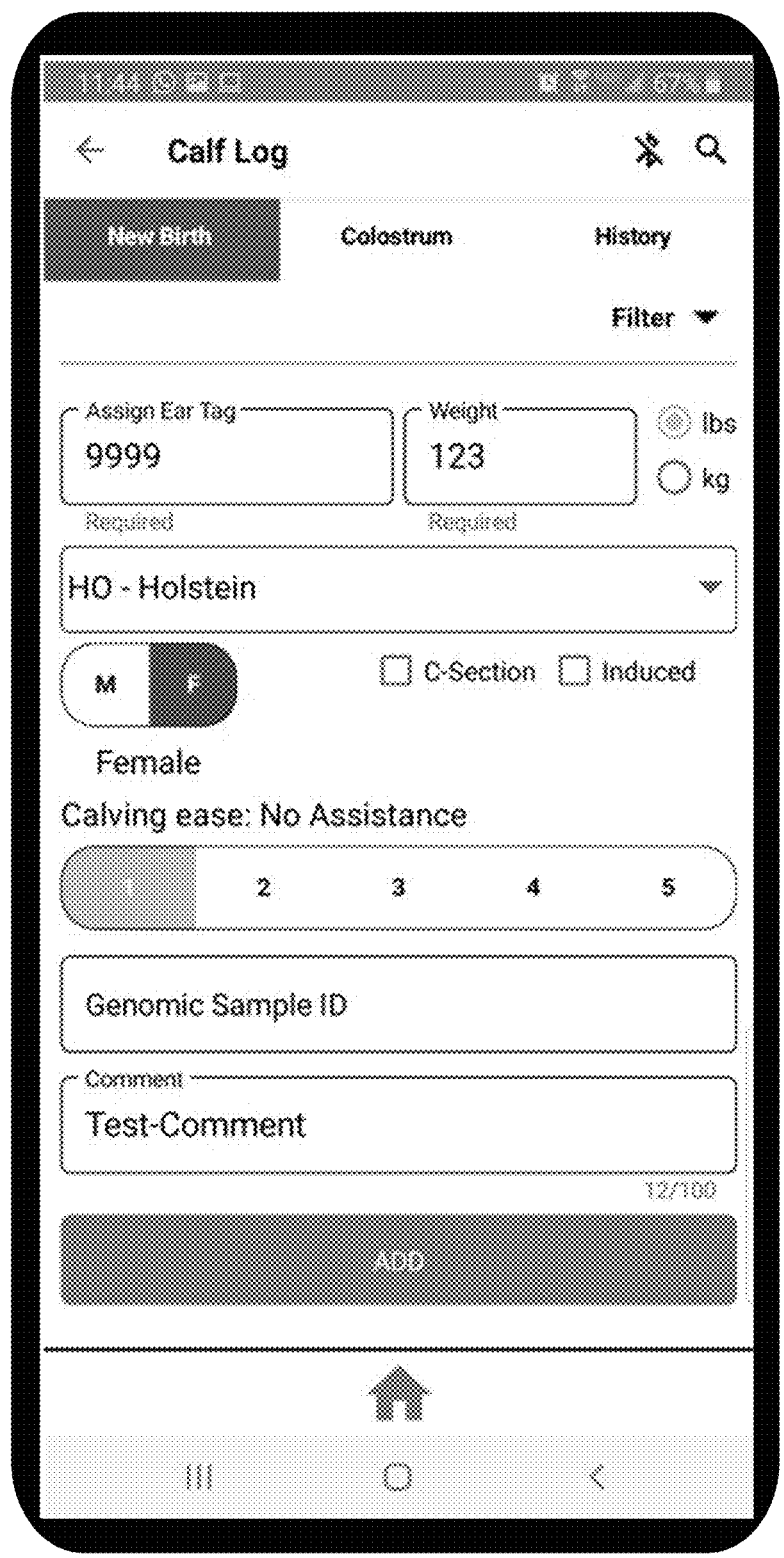

FIGS. 8-16 are screen shots showing various screens that may be displayed at a user computing device as part of the GUI described herein. FIG. 8 shows one example of a birth input screen 800. The birth input screen 800 includes input fields in which a user may inter the date and time of an animal's birth, the type of birth (e.g., live, abort, DOA), an identifier of the dam, an indication of whether the animal has a twin, an RFID tag indicating the animal identifier, an ear tag identifier, a weight of the animal, a breed of the animal, a sex of the animal, a special delivery type (e.g., c-section or induced). FIG. 9 shows another example birth input screen 900 including additional input fields including fields for receiving an indication of the ease of delivery (in this example, on a scale of 1-5), an input field for entering an identifier of a genomic sample identifier, and an input field for entering a comment.

Figure 10:
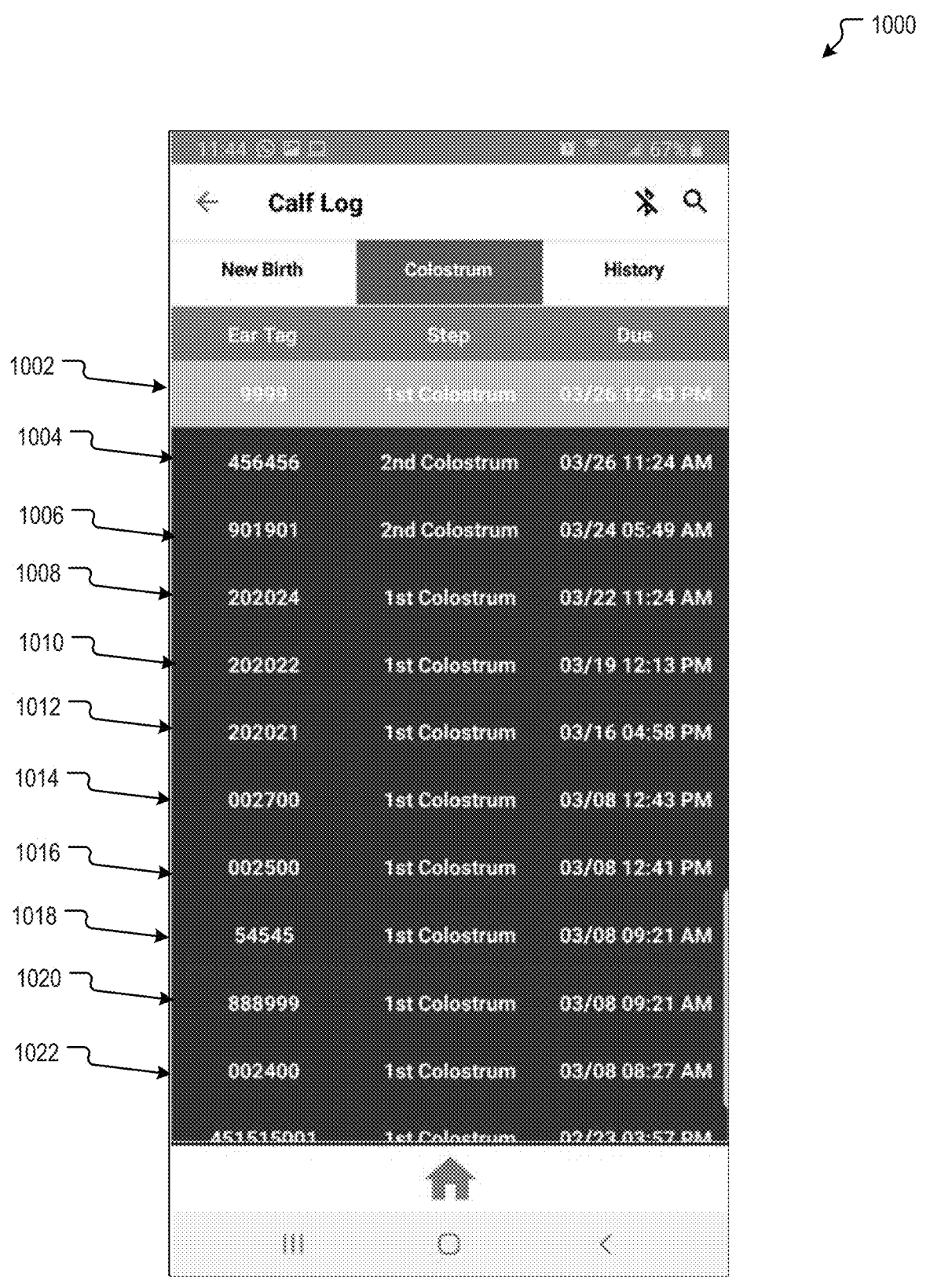

FIG. 10 shows one example of a GUI screen 1000 including various animal visual elements 1002, 1004, 1006, 1008, 1010, 1012, 1014, 1016, 1018, 1020, 1022. As shown, each animal visual element 1002, 1004, 1006, 1008, 1010, 1012, 1014, 1016, 1018, 1020, 1022 indicates an animal identifier in the form of an ear tag number, a next action, and a date and time when the next action is due. The time status of the next action is indicated in the screen 1000, for example, by the due date and time of the next action, the color of the elements 1002, 1004, 1006, 1008, 1010, 1012, 1014, 1016, 1018, 1020, 1022 and, for example, by the order of the elements 1002, 1004, 1006, 1008, 1010, 1012, 1014, 1016, 1018, 1020, 1022.

Figure 11:
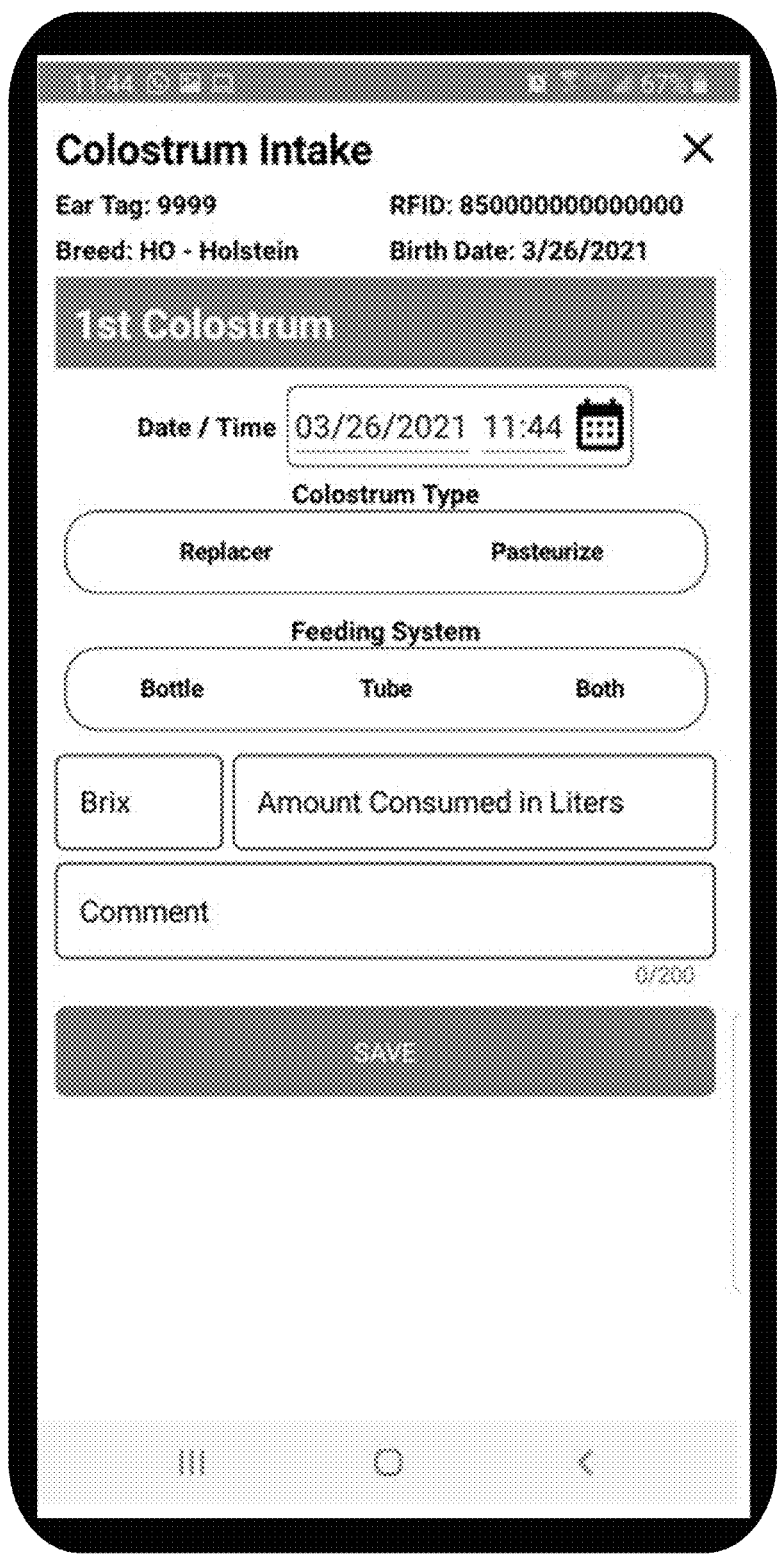
Figure 12:
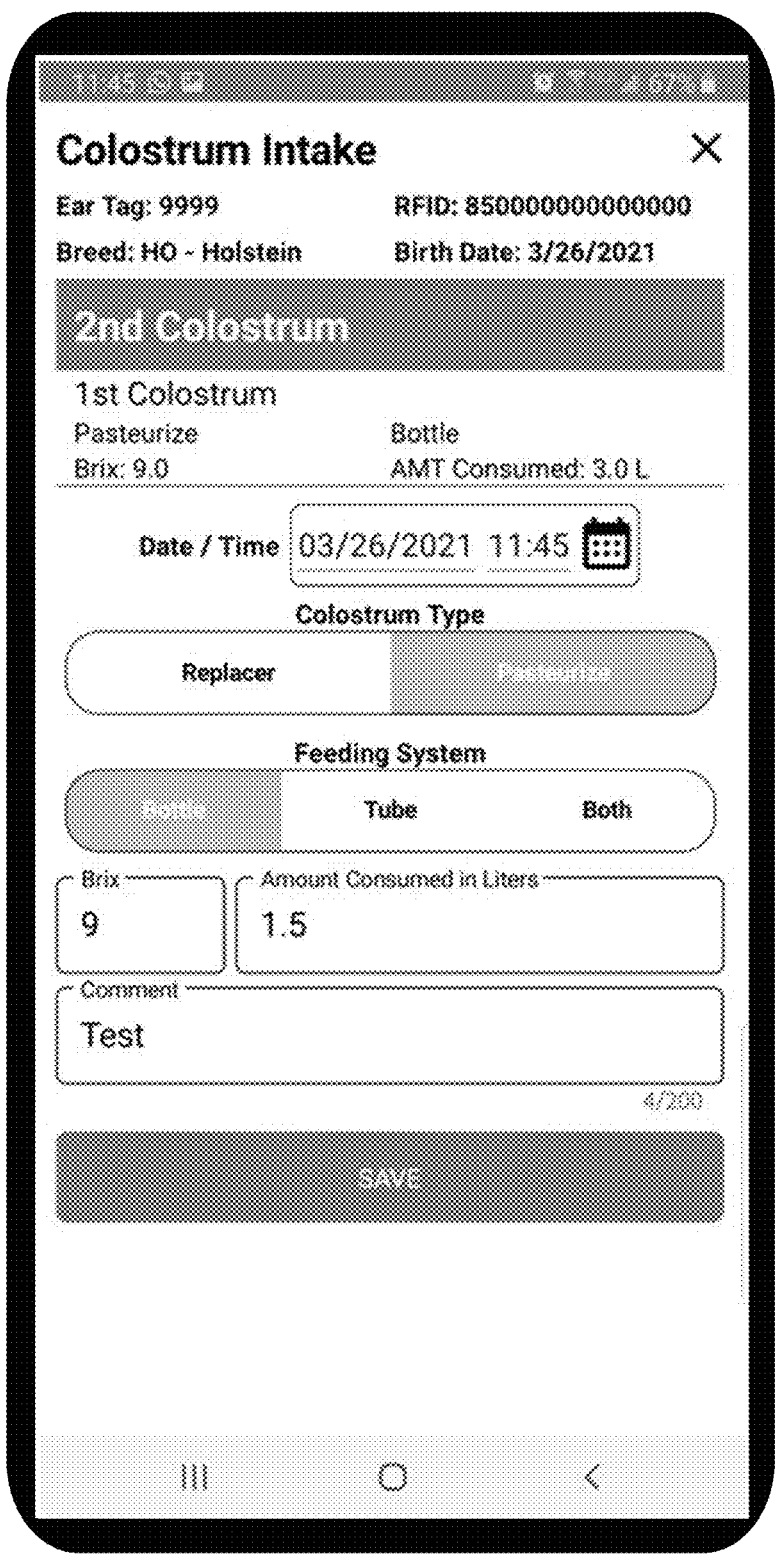

FIG. 11 shows one example of a colostrum input screen 1100. The colostrum input screen 1100 includes fields for entering the date and time of a colostrum feeding, a type of colostrum provided (e.g., a replacer product or pasteurized colostrum previously harvested from the animal's dam or another animal), a feeding technique used (e.g., bottle, tube, or both) a brix score for the colostrum used, an amount of colostrum provided, and a comment. The colostrum input screen 1100 is labeled for a first colostrum feeding. FIG. 12 shows one example of a colostrum input screen 1200 including input fields similar to those of FIG. 11 but labeled for a second colostrum feeding.

Figure 13:
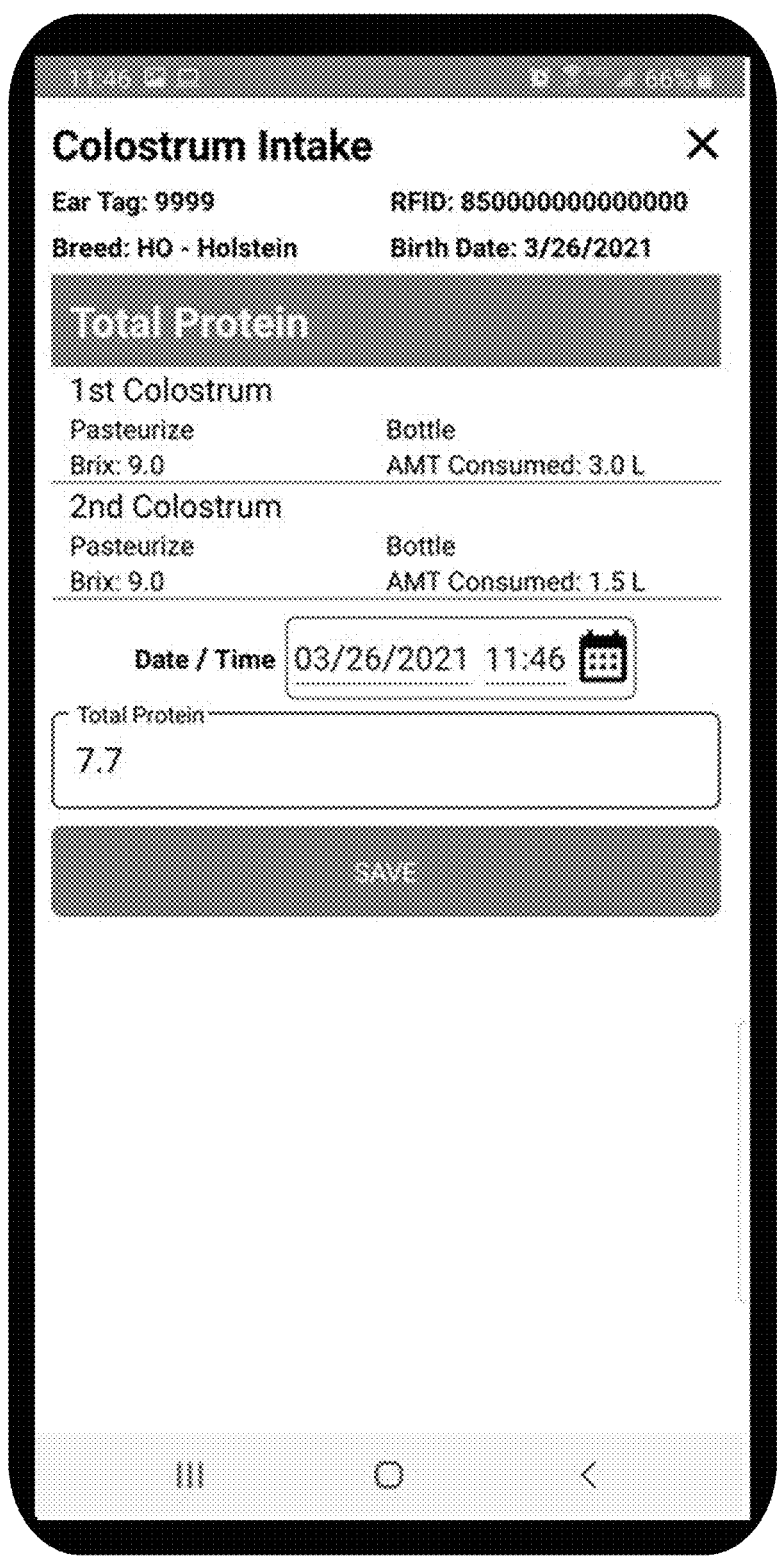

FIG. 13 shows one example of a testing action input screen 1300.

The testing action input screen 1300 is configured to receive the results of a total protein test. The screen 1300 includes input fields for receiving the date and time of the total protein test and a value for the total protein. In the example testing action input screen 1300, first and second colostrum feeding data are also provided for display to the user.

Figure 14:
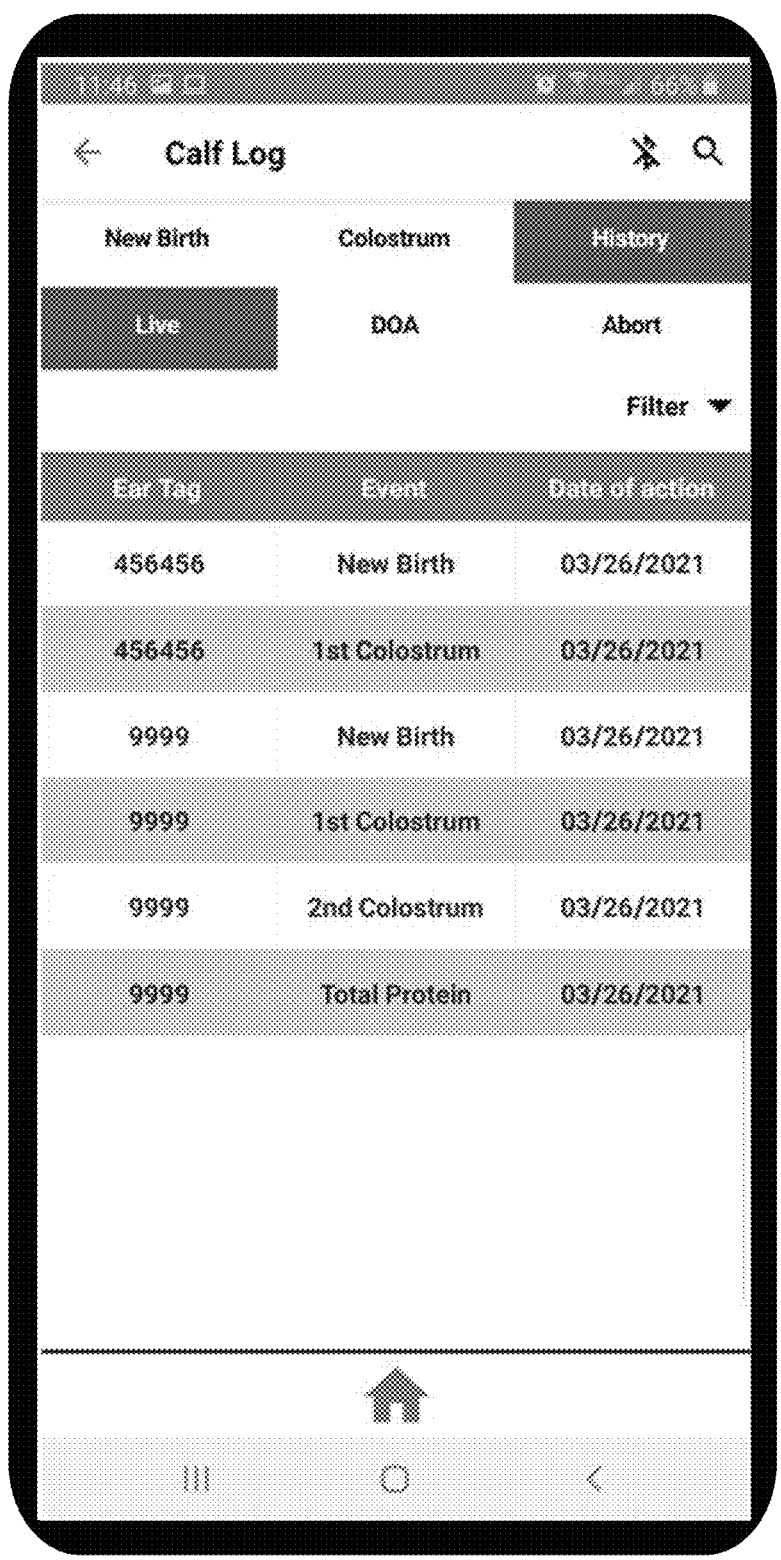

FIG. 14 shows one example of a log screen 1400 that may be displayed at the user computing device to show actions that were recently completed. The actions listed may have been completed using the user computing device and/or other user computing devices of the environment. In the example of FIG. 14, the log screen 1400 shows the animal identifier (e.g., ear tag), action name, and action date for each logged action.

Figure 15:
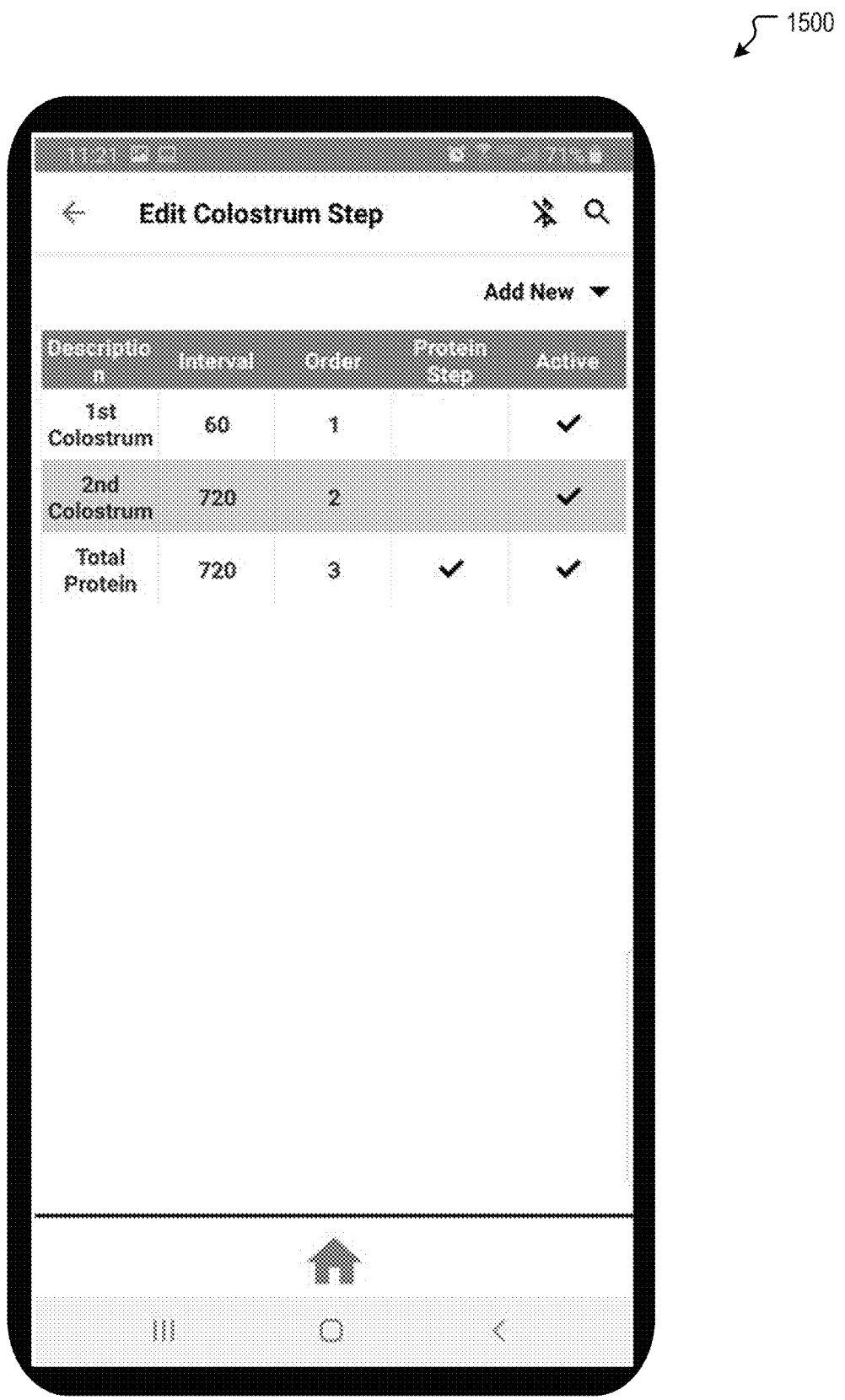
Figure 16:
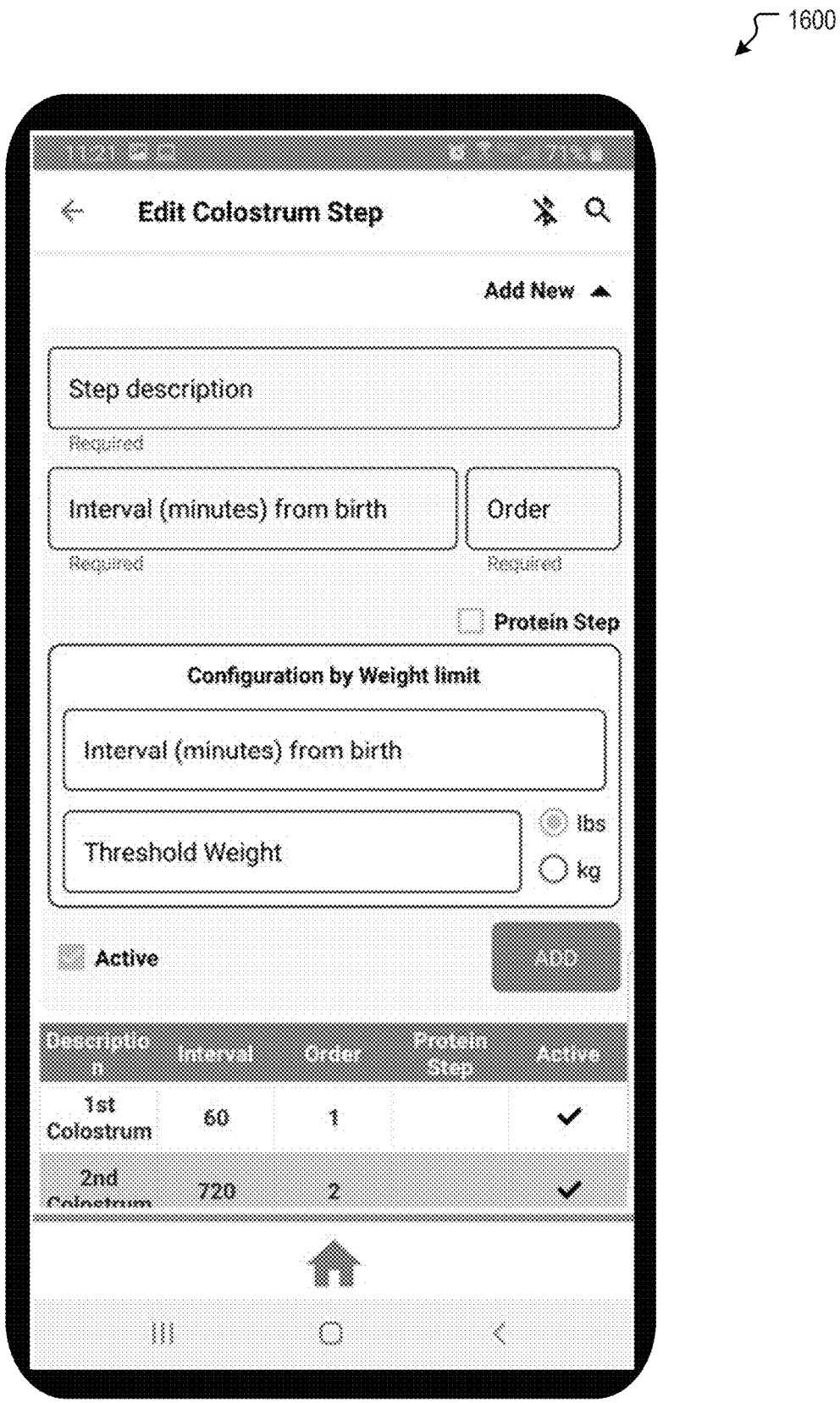

FIGS. 15 and 16 show examples of respective screens 1500 and 1600 that show the configuration of actions for an animal at birth. The screens 1500 and 1600 may be provided, for example, to an administrative user, such as the administrative user 124 of FIG. 1, or another user with suitable privileges for changing the actions that are performed for an animal at birth (e.g., related to colostrum feedings). Changes made at screens 1500 and 1600 may affect the arrangement and operation of the various components described herein.

The screen 1500 shows a current state of post-birth actions. In this example, a first colostrum feeding action is scheduled for 60 minutes from birth. A second colostrum feeding action is scheduled for 720 minutes the first colostrum feeding. A testing action (here, a total protein test) is scheduled for 720 minutes from the second colostrum feeding. The screen 1500 also includes input fields in which a user may activate or deactivate the particular actions and indicate whether a total protein test should be performed at the actions. In the example of FIG. 15, checks are shown indicating that the first colostrum feeding, second colostrum feeding, and total protein testing actions are to be active. A check is shown indicating that a protein test is to be performed with respect to the total protein testing action, but not with respect to the colostrum feeding actions.

The screen 1600 includes fields through which user may add a new action. Fields are present for receiving a description of an action or step, an interval for the action measured to the animal's birth, an order of the action compared to other actions, whether the action is a protein step, a weight limit for the action, and an indication of whether the action is to be active.

Figure 17:
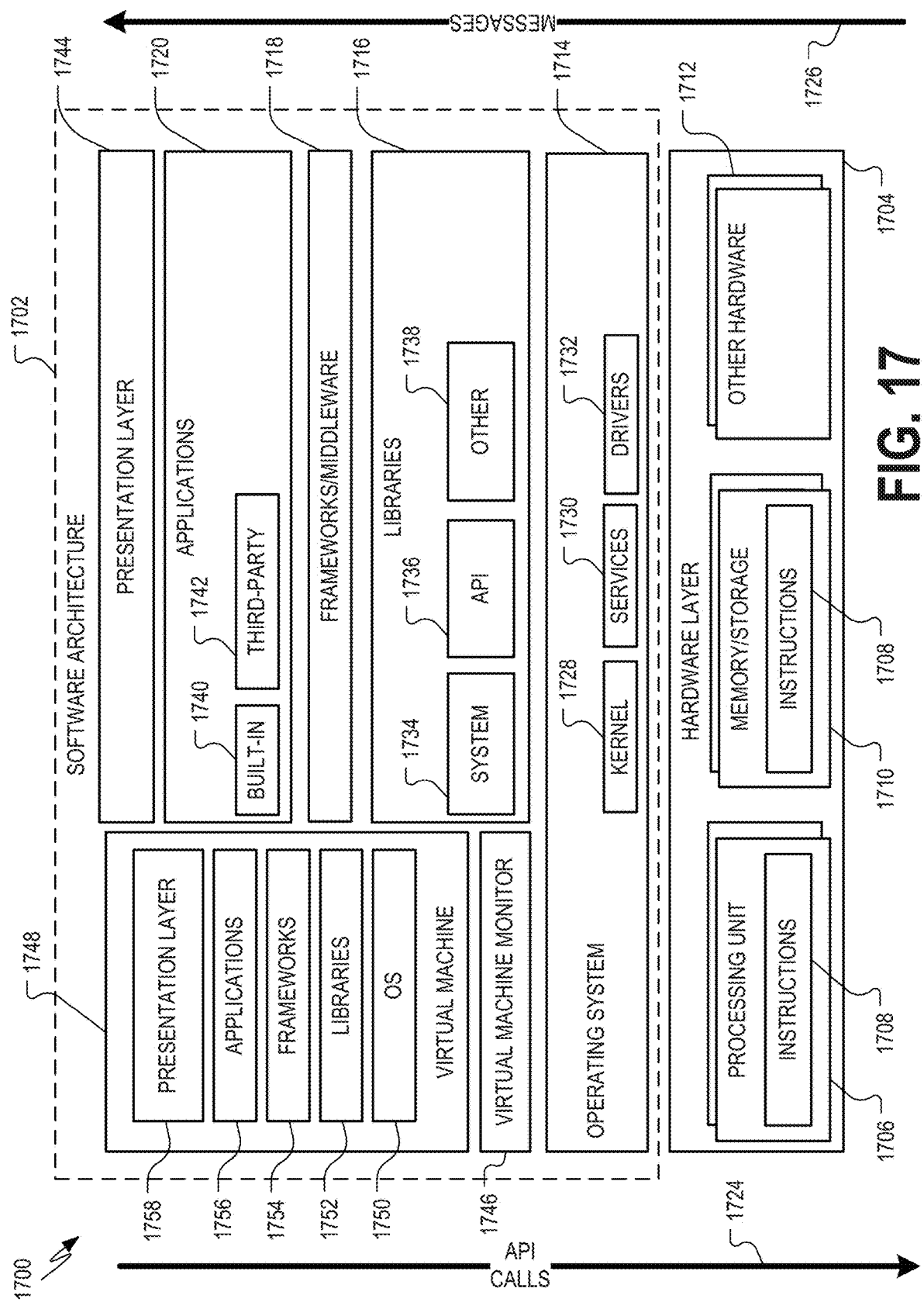
FIG. 17 is a block diagram showing one example of a software architecture for a computing device.

FIG. 17 is a block diagram 1700 showing one example of a software architecture 1702 for a computing device. The architecture 1702 may be used in conjunction with various hardware architectures, for example, as described herein. FIG. 17 is merely a non-limiting example of a software architecture and many other architectures may be implemented to facilitate the functionality described herein. A representative hardware layer 1704 is illustrated and can represent, for example, any of the above referenced computing devices. In some examples, the hardware layer 1704 may be implemented according to the architecture of the computer system of FIG. 17.

The representative hardware layer 1704 comprises one or more processing units 1706 having associated executable instructions 1708. Executable instructions 1708 represent the executable instructions of the software architecture 1702, including implementation of the methods, modules, subsystems, and components, and so forth described herein and may also include memory and/or storage modules 1710, which also have executable instructions 1708. Hardware layer 1704 may also comprise other hardware as indicated by other hardware 1712 which represents any other hardware of the hardware layer 1704, such as the other hardware illustrated as part of the architecture 1702.

In the example architecture of FIG. 17, the software architecture 1702 may be conceptualized as a stack of layers where each layer provides particular functionality. For example, the software architecture 1702 may include layers such as an operating system 1714, libraries 1716, frameworks/middleware 1718, applications 1720, and presentation layer 1744. Operationally, the applications 1720 and/or other components within the layers may invoke API calls 1724 through the software stack and access a response, returned values, and so forth illustrated as messages 1726 in response to the API calls 1724. The layers illustrated are representative in nature and not all software architectures have all layers. For example, some mobile or special purpose operating systems may not provide a frameworks/middleware layer 1718, while others may provide such a layer. Other software architectures may include additional or different layers.

The operating system 1714 may manage hardware resources and provide common services. The operating system 1714 may include, for example, a kernel 1728, services 1730, and drivers 1732. The kernel 1728 may act as an abstraction layer between the hardware and the other software layers. For example, the kernel 1728 may be responsible for memory management, processor management (e.g., scheduling), component management, networking, security settings, and so on. The services 1730 may provide other common services for the other software layers. In some examples, the services 1730 include an interrupt service. The interrupt service may detect the receipt of an interrupt and, in response, cause the architecture 1702 to pause its current processing and execute an interrupt service routine (ISR) when an interrupt is accessed.

The drivers 1732 may be responsible for controlling or interfacing with the underlying hardware. For instance, the drivers 1732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1716 may provide a common infrastructure that may be utilized by the applications 1720 and/or other components and/or layers. The libraries 1716 typically provide functionality that allows other software modules to perform tasks in an easier fashion than to interface directly with the underlying operating system 1714 functionality (e.g., kernel 1728, services 1730 and/or drivers 1732). The libraries 1716 may include system 1734 libraries (e.g., C standard library) that may provide functions such as memory allocation functions, string manipulation functions, mathematic functions, and the like. In addition, the libraries 1716 may include API libraries 1736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1716 may also include a wide variety of other libraries 1738 to provide many other APIs to the applications 1720 and other software components/modules.

The frameworks 1718 (also sometimes referred to as middleware) may provide a higher-level common infrastructure that may be utilized by the applications 1720 and/or other software components/modules. For example, the frameworks 1718 may provide various graphic user interface (GUI) functions, high-level resource management, high-level location services, and so forth. The frameworks 1718 may provide a broad spectrum of other APIs that may be utilized by the applications 1720 and/or other software components/modules, some of which may be specific to a particular operating system or platform.

The applications 1720 includes built-in applications 1740 and/or third party applications 1742. Examples of representative built-in applications 1740 may include, but are not limited to, a contacts application, a browser application, a book reader application, a location application, a media application, a messaging application, and/or a game application. Third party applications 1742 may include any of the built in applications as well as a broad assortment of other applications. In a specific example, the third party application 1742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 1742 may invoke the API calls 1724 provided by the mobile operating system such as operating system 1714 to facilitate functionality described herein.

The applications 1720 may utilize built in operating system functions (e.g., kernel 1728, services 1730 and/or drivers 1732), libraries (e.g., system 1734, APIs 1736, and other libraries 1738), and frameworks/middleware 1718 to create user interfaces to interact with users of the system. Alternatively, or additionally, in some systems interactions with a user may occur through a presentation layer, such as presentation layer 1744. In these systems, the application/module "logic" can be separated from the aspects of the application/module that interact with a user.

Some software architectures utilize virtual machines. In the example of FIG. 17, this is illustrated by virtual machine 1748. A virtual machine creates a software environment where applications/modules can execute as if they were executing on a hardware computing device. A virtual machine is hosted by a host operating system (operating system 1714) and typically, although not always, has a virtual machine monitor 1746, which manages the operation of the virtual machine as well as the interface with the host operating system (i.e., operating system 1714). A software architecture executes within the virtual machine such as an operating system 1750, libraries 1752, frameworks/middleware 1754, applications 1756 and/or presentation layer 1758. These layers of software architecture executing within the virtual machine 1748 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 18:
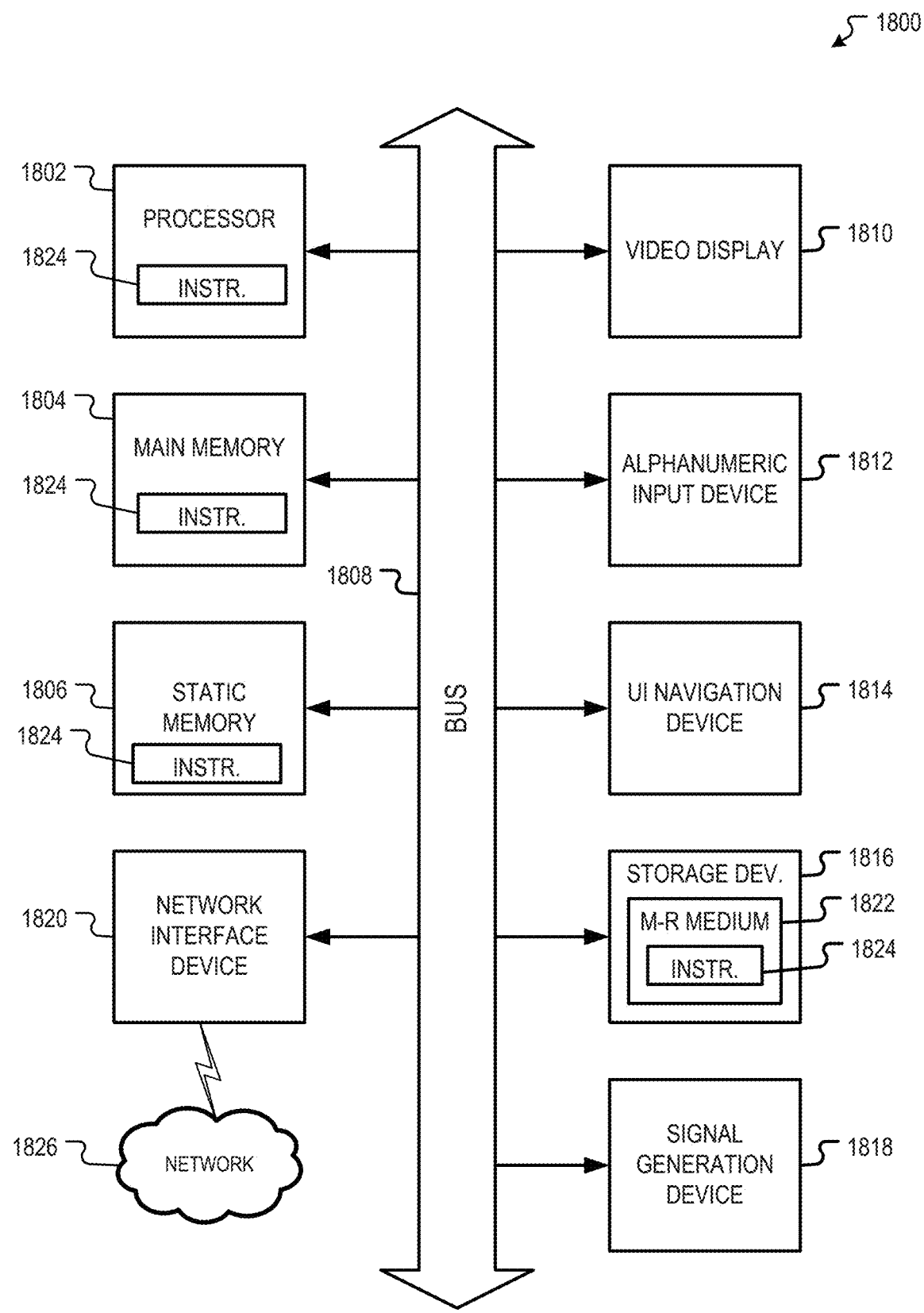
FIG. 18 is a block diagram of a machine in the example form of a computer system within which instructions may be executed for causing the machine to perform any one or more of the methodologies discussed herein.

FIG. 18 is a block diagram of a machine in the example form of a computer system 1800 within which instructions 1824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU), or both), a main memory 1804, and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard or a touch-sensitive display screen), a user interface (UI) navigation (or cursor control) device 1814 (e.g., a mouse), a disk drive unit 1816, a signal generation device 1818 (e.g., a speaker), and a network interface device 1820.

Machine-Readable Medium

The disk drive unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, with the main memory 1804 and the processor 1802 also constituting machine-readable media 1822.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding, or carrying instructions 1824 for execution by the machine and that cause the machine to perform any one or more of the methodologies of the present disclosure, or that is capable of storing, encoding, or carrying data structures utilized by or associated with such instructions 1824. The term "machine-readable medium" shall accordingly be taken to include, but not be limited to, solid-state memories, and optical and magnetic media. Specific examples of machine-readable media 1822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A livestock management system, comprising:
    a first user computing device in communication with a server computing device, the first user computing device programmed to perform operations comprising:
        displaying, at a graphical user interface, a first animal visual element corresponding to a first animal, the first animal visual element indicating a first colostrum feeding of the first animal;
        determining a target time for the first colostrum feeding of the first animal;
        modifying the first animal visual element at the graphical user interface based at least in part on the target time for the first colostrum feeding of the first animal;
        responsive to a selection of the first animal visual element by a user, displaying a first colostrum input screen at the graphical user interface, the first colostrum input screen for receiving first colostrum data describing the first colostrum feeding of the first animal;
        determining a target time for a first testing action for the first animal;
        modifying the first animal visual element at the graphical user interface based at least in part on the target time for the first testing action for the first animal;
        responsive to an additional selection of the first animal visual element by the user, displaying a first testing action input screen for receiving first testing action data describing the first testing action for the first animal; and
        sending, the first colostrum data and the first testing action data to a server computing device.

2. The livestock management system of claim 1, the modifying of the first animal visual element based at least in part on the target time for the first colostrum feeding comprising modifying a color of the first animal visual element.

3. The livestock management system of claim 1, the modifying of the first animal visual element to indicate the target time for the first colostrum feeding comprising changing a position of the first animal visual element relative to a second animal visual element at the graphical user interface.

4. The livestock management system of claim 1, the operations further comprising determining that the user has not selected the first animal visual element to provide the first colostrum data within a threshold time of the target time for the first colostrum feeding of the animal, the modifying of the first animal visual element based at least in part on the target time for the first colostrum feeding of the animal also being based at least in part on the determining that the user has not selected the first animal visual element to provide the first colostrum data within a threshold time of the target time for the first colostrum feeding of the animal.

5. The livestock management system of claim 1, the first user computing device further programmed to perform operations comprising:
    displaying, at the graphical user interface, a second animal visual element corresponding to a second animal, the second animal visual element indicating a first colostrum feeding of the second animal;
    determining a target time for the first colostrum feeding of the second animal; and
    modifying the second animal visual element based at least in part on the target time for the first colostrum feeding of the second animal.

6. The livestock management system of claim 5, the first user computing device being further programmed to perform operations comprising arranging the first animal visual element and the second animal visual element at the graphical user interface to indicate that a next action for the first animal is before a next action for the second animal.

7. The livestock management system of claim 6, the arranging comprising positioning the first animal visual element above the second animal visual element at a screen of the first user computing device.

8. The livestock management system of claim 1, the first colostrum input screen comprising an import button, the first user computing device further programmed to perform operations comprising:
    responsive to receiving a selection of the import button, initiating communication with an external device; and
    receiving at least a portion of the first colostrum data from the external device.

9. The livestock management system of claim 8, the external device comprising a Radio Frequency Identification (RFID) reader, the first user computing device being further programmed to perform operations comprising prompting the user to use the RFID reader to read an RFID tag associated with a colostrum container including colostrum for the first colostrum feeding.

10. The livestock management system of claim 8, the external device comprising an image sensor of the first user computing device, the first user computing device being further programmed to perform operations comprising using the image sensor to capture an image of at least a portion of a colostrum container including colostrum for the first colostrum feeding.

11. The livestock management system of claim 1, further comprising:
   a bolus for ingestion by the first animal, the bolus comprising a bolus temperature sensor; and
   a second user computing device programmed to perform operations comprising:
      initiating a wireless connection between the second user computing device and the bolus;
      receiving, from the bolus and via the wireless connection, sensor data describing the first animal; and
      sending the sensor data to the server computing device.

12. The livestock management system of claim 11, further comprising the server computing device, the server computing device being programmed to perform operations comprising:
   receiving the first colostrum data, and the first testing action data from the first user computing device;
   receiving the sensor data from the second user computing device;
   detecting a health event for the first animal using the sensor data, the detecting based at least in part on the testing action data; and
   sending an alert message to a second user computing device, the alert message comprising at least a portion of the sensor data and at least a portion of the first testing action data.

13. The livestock management system of claim 1, the operations further comprising:
   displaying, at the graphical user interface, a birth input screen comprising at least one field for receiving birth data describing the first animal; and
   sending the birth data to the server computing device.

14. A livestock management method, comprising:
   displaying, by a first user computing device, a first animal visual element at a graphical user interface provided at a display of the first user computing device, the first animal visual element corresponding to the first animal and indicating a first colostrum feeding of the first animal;
   determining, by the first user computing device, a target time for the first colostrum feeding of the first animal;
   modifying, by the first user computing device, the first animal visual element based at least in part on the target time for the first colostrum feeding;
   responsive to receiving a selection of the first animal visual element by a user, displaying, by the first user computing device, a first colostrum input screen at the graphical user interface, the first colostrum input screen for receiving first colostrum data describing the first colostrum feeding of the first animal;
   determining, by the first user computing device, a target time for a first testing action for the first animal;
   modifying, by the first user computing device, the first animal visual element based at least in part on the target time for the first testing action for the first animal;
   responsive to receiving an additional selection of the first animal visual element by the user, displaying, by the first user computing device, a first testing action input screen at the graphical user interface, the first testing action input screen for receiving first testing action data describing the first testing action for the first animal; and
   sending, by the first user computing device, the first colostrum data and the first testing action data to a server computing device.

15. The method of claim 14, the modifying of the first animal visual element based at least in part on the target time for the first colostrum feeding comprising modifying a color of the first animal visual element.

16. The method of claim 14, further comprising:
   displaying, by the first user computing device at the graphical user interface, a second animal visual element corresponding to a second animal, the second animal visual a first colostrum feeding of the second animal;
   determining, by the first user computing device, a target time for the first colostrum feeding of the second animal;
   modifying the second animal visual element, by the first user computing device, the modifying based at least in part on the target time for the first colostrum feeding of the second animal; and
   arranging the first animal visual element and the second animal visual element at the graphical user interface to indicate that a next action for the first animal is before a next action for the second animal.

17. The method of claim 14, further comprising:
   initiating, by a second user computing device, a wireless connection between the second user computing device and a bolus ingested by the first animal;
   receiving, by the second user computing device and from the bolus and via the wireless connection, temperature data describing a temperature at the first animal; and
   sending, by the second user computing device, the temperature data to the server computing device.

18. The method of claim 17, further comprising:
   the server computing device, the server computing device being programmed to perform operations comprising:
   receiving, by a server computing device, the first colostrum data, and the first testing action data from the first user computing device;
   receiving, by the server computing device, the temperature data from the second user computing device;
   detecting, by the server computing device, a health event for the first animal using the temperature data, the detecting based at least in part on the testing action data; and
   sending, by the server computing device, an alert message to a second user computing device, the alert message comprising at least a portion of the temperature data and at least a portion of the first testing data.

19. The method of claim 14, further comprising:
   displaying, by the user computing device at the graphical user interface, a birth input screen comprising at least one field for receiving birth data describing the first animal; and
   sending the birth data to the server computing device.

20. A non-transitory machine-readable medium comprising instructions thereon that, when executed by at least one processor, causes the at least one processor to perform operations comprising:
   displaying, at a graphical user interface, a first animal visual element corresponding to a first animal, the first animal visual element indicating a first colostrum feeding of the first animal;

determining a target time for the first colostrum feeding of the first animal;

modifying the first animal visual element at the graphical user interface based at least in part on the target time for the first colostrum feeding of the first animal;

responsive to a selection of the first animal visual element by a user, displaying a first colostrum input screen at the graphical user interface, the first colostrum input screen for receiving first colostrum data describing the first colostrum feeding of the first animal;

determining a target time for a first testing action for the first animal;

modifying the first animal visual element at the graphical user interface based at least in part on the target time for the first testing action for the first animal;

responsive to an additional selection of the first animal visual element by the user, displaying a first testing action input screen for receiving first testing action data describing the first testing action for the first animal; and sending, the first colostrum data and the first testing action data to a server computing device.

* * * * *